US011596149B2

(12) United States Patent
Chiattello et al.

(10) Patent No.: US 11,596,149 B2
(45) Date of Patent: Mar. 7, 2023

(54) METHODS OF PREPARING HIGHLY CHARGED POLYETHYLENIMINE AND COMPOSITIONS AND USES THEREOF

(71) Applicant: eXion Labs Inc., West Des Moines, IA (US)

(72) Inventors: Marion L. Chiattello, Cedar Falls, IA (US); Mark Oman, West Des Moines, IA (US)

(73) Assignee: eXion Labs Inc., West Des Moines, IA (US)

( * ) Notice: Subject to any disclaimer, the term of this patent is extended or adjusted under 35 U.S.C. 154(b) by 0 days.

(21) Appl. No.: 17/307,671

(22) Filed: May 4, 2021

(65) Prior Publication Data
US 2021/0337790 A1 Nov. 4, 2021

Related U.S. Application Data
(60) Provisional application No. 63/019,788, filed on May 4, 2020.

(51) Int. Cl.
*A01N 33/04* (2006.01)
*C08G 73/02* (2006.01)
*A01N 59/20* (2006.01)
*A01N 37/02* (2006.01)

(52) U.S. Cl.
CPC ............. *A01N 33/04* (2013.01); *A01N 37/02* (2013.01); *A01N 59/20* (2013.01); *C08G 73/0213* (2013.01)

(58) Field of Classification Search
CPC ........ A01N 33/04; A01N 37/02; A01N 59/20; A01N 33/12; C08G 73/0213; C08G 73/0226; A01P 1/00
See application file for complete search history.

(56) References Cited

U.S. PATENT DOCUMENTS

2014/0369953 A1* 12/2014 Purschwitz ........ C08G 73/0206
514/718
2015/0320654 A1* 11/2015 Li ............................ A61K 8/73
424/49

FOREIGN PATENT DOCUMENTS

WO WO-2018022926 A1 * 2/2018 ........... C09D 139/00

OTHER PUBLICATIONS

Yakoob, Javed, et al. "Comparison of antimicrobial activity of zinc chloride and bismuth subsalicylate against clinical isolates of Helicobacter pylori." Microbial Drug Resistance 20.4 (2014): 305-309.*

Bansal, R., et al. "Lipophilic and cationic triphenylphosphonium grafted linear polyethylenimine polymers for efficient gene delivery to mammalian cells." Journal of Materials Chemistry 22.48 (2012): 25427-25436.*
Bansal et al., "Enhanced Antimicrobial Activity of Amine-Phosphonium (N—P) Hybrid Polymers Against Gram-Negative and Gram-Positive Bacteria," *International Journal of Polymeric Materials and Polymeric Biomaterials*, 64(2): 84-89 (2015).
Curtis et al., "Unusual Salt and pH Induced Changes in Polyethylenimine Solutions," *PLoS One*, 11(9): e0158147 (2016).
Endo et al., "Antimicrobial Activity of Tertiary Amine Covalently Bonded to a Polystyrene Fiber," *Appl. Environ. Microbiol.*, 53(9): 2050-2055 (1987).
Gao et al., "Studies on the preparation and antibacterial properties of quaternized polyethyleneimine," *J. Biomater. Sci. Polymer Edn.*, 18(5): 531-544 (2007).
Gibney et al., "Poly(ethylene imine)s as antimicrobial agents with selective activity," *Macromol. Biosci.*, 12(9): 1279-1289 (2012).
Halstead et al., "The Antibacterial Activity of Acetic Acid against Biofilm-Producing Pathogens of Relevance to Burns Patients," *PLoS One*, 10(9): e0136190 (2015).
Hirshfield et al., "Weak organic acids: a panoply of effects on bacteria," *Science Progress*, 86(Pt 4): 245-269 (2003).
Jarboe et al., "Understanding biocatalyst inhibition by carboxylic acids," *Front. Microbiol.*, 4: Article 272, 1-8 (2013).
Kanazawa et al., "Polymeric Phosphonium Salts as a Novel Class of Cationic Biocides. IV. Synthesis and Antibacterial Activity of Polymers with Phosphonium Salts in the Main Chain," *J. Polym. Sci. A Polym. Chem.*, 31: 3031-3038 (1993).
Kanazawa et al., "Synthesis and Antimicrobial Activity of Dimethyl- and Trimethyl-Substituted Phosphonium Salts with Alkyl Chains of Various Lengths," *Antimicrob. Agents Chemother.*, 38(5): 945-952 (1994).
Kontarov et al., "The study of the antiviral activity of polyelectrolytes with respect to the influenza virus," *Vopr. Virusol.*, 60(4): 5-9 (2015).
Kugler et al., "Evidence of a charge-density threshold for optimum efficiency of biocidal cationic surfaces," *Microbiology*, 151(Pt 5): 1341-1348 (2005).
Kumar et al., "Synthesis, Characterization, Antimicrobial Activity, and Adhesive Property of Amino Benzyl Group Substituted Acrylic/Methacrylic Polymers and Their Copolymers," *Int. J. Polym. Mater. Polym. Biomater.*, 62(12) 627-634 (2013).

(Continued)

*Primary Examiner* — Matthew P Coughlin
*Assistant Examiner* — Thurman Wheeler
(74) *Attorney, Agent, or Firm* — Leydig, Voit & Mayer, Ltd.

(57) ABSTRACT

A method of preparing a disinfecting composition comprising charged polyethylenimine (PEI), the method comprising adding a base to an aqueous solution comprising a linear PEI hydrochloride solution to provide a linear PEI salt solution with a pH between 9-11, adding a first organic acid to reduce the pH to less than 7, removing about 20% to 100% of the salt from the solution, and optionally adding water and/or a second organic acid to obtain the disinfecting composition with a pH of 2-7. The method can further comprise adding at least one metal salt to the disinfecting composition. The resulting disinfecting solution can be used to provide antimicrobial products with enhanced antimicrobial performance, reduced toxicity, and/or able to leave a persistent "kill-later" film.

17 Claims, 3 Drawing Sheets

(56) References Cited

OTHER PUBLICATIONS

Kumar et al., "Chitosan Biopolymer Schiff Base: Preparation, Characterization, Optical, and Antibacterial Activity," *J. Int. J. Polym. Mater., Polym. Biomater.*, 63(4): 173-177 (2014).

Lu et al., "Molecular Architecture and Charging Effects Enhance the In Vitro and In Vivo Performance of Multi-Arm Antimicrobial Agents Based on Star-Shaped Poly(L-lysine)," *Advanced Therapeutics*, 2(12): 1900147 (2019).

Mady et al., "Effect of Polymer Molecular Weight on the DNA/PEI Polyplexes Properties," *Romanian J. Biophys*, 21(2): 151-165 (2011).

Mageswari et al., "Synthesis, Characterization and Study of Antibacterial Activity of Methacrylic Copolymer," *Polym.-Plast. Technol. Eng.*, 51: 1296-1302 (2012).

Milović et al., "Immobilized N-Alkylated Polyethylenimine Avidly Kills Bacteria by Rupturing Cell Membranes With No Resistance Developed," *Biotechnol. Bioeng.*, 90(6): 715-722 (2005).

Riaz et al., "Evaluation of Antibacterial Activity of Nanostructured Copolymers of Poly (Napthylamine)," *Int. J. Polym. Mater. Polym. Biomater.*, 62(7): 406-410 (2013).

Ryssel et al., "The antimicrobial effect of acetic acid—An alternative to common local antiseptics?" *Burns*, 35(5): 695-700 (2009).

Serinçay et al., "PVA/PAA-Based Antibacterial Wound Dressing Material with Aloe Vera," *Polymer Plastics Technol. Engineering*, 52(13): 1308-1315 (2013).

Spoden et al., "Polyethylenimine Is a Strong Inhibitor of Human Papillomavirus and Cytomegalovirus Infection," *Antimicrob. Agents Chemother.*, 56(1): 75-82 (2012).

Thomas et al., "Full deacylation of polyethylenimine dramatically boosts its gene delivery efficiency and specificity to mouse lung," *Proc. Natl. Acad. Sci. USA*, 102(16): 5679-5684 (2005).

Zander et al., "Charge Density Quantification and Antimicrobial Efficacy," *U.S. Army Research Laboratory*, pp. 1-13 (2008).

Ziebarth et al., "Understanding the protonation behavior of linear polyethylenimine in solutions through Monte Carlo simulations," Biomacromolecules, 11(1): pp. 1-29 (2010).

\* cited by examiner

METHODS OF PREPARING HIGHLY CHARGED POLYETHYLENIMINE AND COMPOSITIONS AND USES THEREOF

CROSS-REFERENCE TO A RELATED APPLICATION

This patent application claims the benefit of U.S. Provisional Patent Application No. 63/019,788, filed May 4, 2020, which is incorporated by reference.

BACKGROUND OF THE INVENTION

Cationic polymers characteristically display antimicrobial activity against both gram-positive and gram-negative bacteria, yeast, and fungal pathogens, as well as enveloped and non-enveloped viruses. See, for example, Thomas et al., *PNAS*, 2005, 102(16), 5679-5684; Kanazawa et al., *J. Polym. Sci. A Polym. Chem.*, 1993, 31, 3031; Spoden et al., *Antimicrobial Agents and Chemotherapy*, 2012, 56(1), 75-82; Gao et al., *J. Biomat. Sci. Polym. Ed.*, 2007, 18, 531; Milovic et al., *Biotechnol. Bioeng.*, 2005, 90, 715; Endo et al., *Applied and Environmental Microbiology*, 1987, 53(9), 2050-2055; and Kontarov et al., *Vopr Virusol.*, 2015; 60(4), 5-9. One advantage of cationic polymers is that they are able to address the disadvantages associated with low molecular weight antimicrobial agents, which are limited to short-term antimicrobial action and tend to create residual toxicity to the environment. See, for example, Kumara et al., *Int. J. Polym. Mater. Polym. Biomater.*, 2013, 62, 627; Riaz et al., *Int. J. Polym. Mater. Polym. Biomater.*, 2013, 62, 406; and Kumar et al., *J. Int. J. Polym. Mater., Polym. Biomater.*, 2014, 63, 173. Polymeric antimicrobial agents tend to be non-leaching, chemically stable, and less toxic to environment. They also have the advantages of creating residual antimicrobial films and do not penetrate through animal or human skin (Serincay et al., *Polymer-Plastics Technology and Engineering*, 2013, 52(13), 1308-1315; and Mageswari et al., *Polym.-Plast. Technol. Eng.*, 2012, 51, 1296).

In general, it is recognized that the killing mechanism of cationic polymers consists of the positive charges of the polymer targeting the negatively charged membranes of pathogenic microbes. Even though the precise method of bacterial cell death from cationic polyelectrolytes remains unknown, the charge density of the polymer plays an important role in disrupting the cellular membrane. Zander et al. reported that as the charge density increases the deactivation of bacteria increases (Zander et al., "Charge Density Quantification and Antimicrobial Efficacy," U.S. Army Research Laboratory, 2008). Kügler et al. determined that there is a charge density threshold above which cell death is rapid (Kügler et al., *Microbiology*, 2005, 151(5), 1341-1348). Another study demonstrated that an increase in charge density resulted in enhanced binding affinity toward bacterial membranes (Lu et al., *Advanced Therapeutics*, 2019, 2(12), 1900147). This increased charge density resulted in enhanced antimicrobial performance as shown by the Minimum Inhibitory Concentration (MIC).

Since charge density is a primary mechanism by which cationic polymers inactivate bacteria and viruses, there is an ongoing need for the development of synthetic polymeric materials with improved charge density.

BRIEF SUMMARY OF THE INVENTION

The invention provides a method of preparing a disinfecting composition comprising charged polyethylenimine (PEI), the method comprising:

(i) providing an aqueous solution comprising a linear PEI hydrochloride solution, (ii) adding a base in an amount to provide a linear PEI salt solution with a pH between 9-11, (iii) adding a first organic acid to the solution obtained in (ii) to reduce the pH to less than 7, (iv) removing about 20% to 100% of the salt from the solution obtained in (iii), and then (v) optionally adding water and/or a second organic acid to the solution obtained in to obtain the disinfecting composition with a pH of 2-7.

The method can further comprise step (vi) adding at least one metal salt to the disinfecting composition comprising charged linear PEI with a reduced salt content.

The resulting disinfecting solution can be used to provide novel antimicrobial products that provide at least one benefit: enhanced antimicrobial performance, reduced toxicity, and able to leave a persistent, residual "kill-later" film.

DETAILED DESCRIPTION OF THE INVENTION

The present invention is predicated, at least in part, on the discovery that the charge density of linear polyethylenimine (PEI) in solution, as measured by the zeta potential, can be improved through various method steps performed in combination. The method steps provide an antimicrobial solution of zeta-enhanced linear PEI with a reduced salt content in combination with organic acid, optionally at least one metal salt, and water. Accordingly, the invention provides a method of preparing a disinfecting composition comprising charged linear PEI, the method comprising:

(i) providing an aqueous solution comprising a linear PEI hydrochloride solution, (ii) adding a base in an amount to provide a linear PEI salt solution with a pH between 9-11, (iii) adding a first organic acid to the solution obtained in (ii) to reduce the pH to less than 7, (iv) removing about 20% to 100% of the salt from the solution obtained in (iii), and then (v) optionally adding water and/or a second organic acid to the solution obtained in (iv), to obtain the disinfecting composition with a pH of 2-7. The disinfecting composition comprises charged linear PEI with a reduced salt content, organic acid, and water. The method does not rely on chemical transformation of PEI in that no functional groups (e.g., pendant side chains) are added to the PEI backbone.

In some embodiments of the method, the method further comprises step (vi) adding at least one metal salt to the disinfecting composition comprising charged linear PEI, organic acid, and water.

In spite of considerable research on the application of linear polyethylenimine (LPEI) as an antimicrobial agent, there are currently no commercial antimicrobial LPEI products on the market. This lack of implementation is evidenced by the United States Environmental Protection Agency (EPA) not listing LPEI as an approved active or inert antimicrobial substance.

Figure 1:
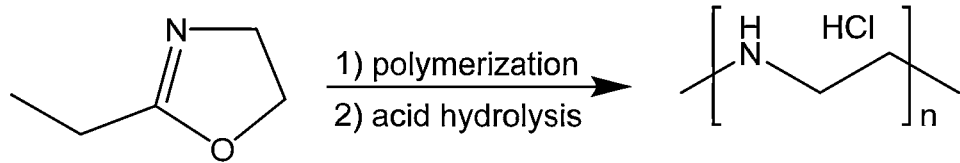
FIG. 1 is a chemical scheme of ring opening polymerization of 2-ethyl-2-oxazoline followed by acid hydrolysis to form linear PEI hydrochloride.

Linear PEI typically is prepared via ring opening polymerization of 2-ethyl-2-oxazoline followed by acid hydrolysis with hydrochloric acid. Normally this hydrolysis leaves residual hydrochloride (HCl) and N-acyl groups. The N-acyl groups can be removed by exhaustive (e.g., 96 hour) acid hydrolysis to provide LPEI. See FIG. 1.

Linear PEI generally is available in two distinct forms: the hydrochloride form and the non-hydrochloride form (free base). Commercial LPEI products are near 100% acid hydrolyzed and would not be considered a co-polymer with 2-ethyl-2-oxazoline.

Linear PEI typically is used as a transfection reagent for transferring DNA into cells. For use as a transfection reagent, sodium hydroxide or another suitable base is added to PEI hydrochloride to neutralize the acid, bring the pH of the PEI to 7, and form NaCl. Alternatively, non-hydrochloride PEI is made water soluble by adding a sufficient amount of HCl to bring the pH of the solution to less than 2. Sodium hydroxide is then added to the newly prepared PEI HCl to neutralize the pH to 7 and form NaCl. See, e.g., Cold Spring Harbor Protocols, 2008, doi: 10.1101/pdb.red11323. These methods work well when making LPEI transfection reagents. However, these methods are limited when producing LPEI solutions designed to improve the antimicrobial effectiveness of LPEI because the method steps are insufficient to enhance the charge density of LPEI.

Step (i) requires providing an aqueous solution comprising linear PEI hydrochloride. The linear PEI hydrochloride can be commercially obtained or prepared using methods known in the art. For example, 2-ethyl-2-oxazoline can be polymerized and then fully hydrolyzed (deacylated and/or depropionylated) to form linear PEI that can be acidified with hydrochloric acid. In general, the linear PEI hydrochloride used for the method will be fully hydrolyzed (fully deacylated) and highly water soluble when the pH is 3 or less. Additionally, the linear PEI is non-chemically modified in that no functional groups are present (e.g., covalently attached) on the PEI backbone. The linear PEI hydrochloride can be used in any form, including powdered, slurry, or solution (e.g., aqueous solution) form.

The linear PEI hydrochloride has any suitable number average molecular weight to provide a desired charge density and solubility characteristics (e.g., soluble in water and/or the second organic acid). Typically, the linear PEI hydrochloride will have a number average molecular weight of about 1,000 g/mol or more. In some embodiments, the linear PEI hydrochloride will have a number average molecular weight of about 2,000 g/mol or more, such as about 3,000 g/mol or more, about 4,000 g/mol or more, about 5,000 g/mol or more, about 6,000 g/mol or more, about 7,000 g/mol or more, about 8,000 g/mol or more, about 9,000 g/mol or more, about 10,000 g/mol or more, about 12,000 g/mol or more, about 15,000 g/mol or more, about 18,000 g/mol or more, about 20,000 g/mol or more, about 25,000 g/mol or more, about 28,000 g/mol or more, about 30,000 g/mol or more, about 35,000 g/mol or more, about 38,000 g/mol or more, about 40,000 g/mol or more, about 45,000 g/mol or more, about 50,000 g/mol or more, about 55,000 g/mol or more, about 60,000 g/mol or more, about 65,000 g/mol or more, about 70,000 g/mol or more, about 75,000 g/mol or more, about 80,000 g/mol or more, about 85,000 g/mol or more, about 90,000 g/mol or more, about 95,000 g/mol or more, about 100,000 g/mol or more, about 110,000 g/mol or more, about 120,000 g/mol or more, about 130,000 g/mol or more, about 140,000 g/mol or more, about 150,000 g/mol or more, about 160,000 g/mol or more, about 170,000 g/mol or more, about 180,000 g/mol or more, about 190,000 g/mol or more, or about 200,000 g/mol or more). The linear PEI hydrochloride typically will have a number average molecular weight of about 2,000,000 g/mol or less (e.g., 1,500,000 g/mol or less, 1,000,000 g/mol or less, 950,000 g/mol or less, 900,000 g/mol or less, 850,000 g/mol or less, 800,000 g/mol or less, 750,000 g/mol or less, 700,000 g/mol or less, 650,000 g/mol or less, 600,000 g/mol or less, 550.00 g/mol or less, 500,000 g/mol or less, about 450,000 g/mol or less, about 400,000 g/mol or less, about 390,000 g/mol or less, about 380,000 g/mol or less, about 370,000 g/mol or less, about 360,000 g/mol or less, about 350,000 g/mol or less, about 340,000 g/mol or less, about 330,000 g/mol or mol less, about 320,000 g/mol or less, about 310,000 g/mol or less, about 300,000 g/mol or less, about 290,000 g/mol or less, about 280,000 g/mol or less, about 270,000 g/mol or less, about 260,000 g/mol or less, about 250,000 g/mol or less, about 240,000 g/mol or less, about 230,000 g/mol or less, about 220,000 g/mol or less, about 210,000 g/mol or less, about 200,000 g/mol or less, about 190,000 g/mol or less, about 180,000 g/mol or less, about 170,000 g/mol or less, about 160,000 g/mol or less, about 150,000 g/mol or less, about 140,000 g/mol or less, 130,000 g/mol or less, 120,000 g/mol or less, 110,000 g/mol or less, 100,000 g/mol or less, 90,000 g/mol or less, 80,000 g/mol or less, 70,000 g/mol or less, 60,000 g/mol or less, 50,000 g/mol or less, 40,000 g/mol or less, or 30,000 g/mol or less). Any two of the foregoing endpoints can be used to define a close-ended range, or a single endpoint can be used to define an open-ended range. In some embodiments, the linear PEI hydrochloride has an average molecular weight in the range of about 1,000-500,000 g/mol, including about 2,500-250,000 g/mol, about 5,000-400,000 g/mol, about 10,000-300,000 g/mol, about 20,000-200,000 g/mol, and about 30,000-180,000 g/mol. In other embodiments, the linear PEI hydrochloride has an average molecular weight in the range of about 30,000-60,000 g/mol (e.g., about 35,000-50,000 g/mol).

It has been found that the concentration of linear PEI affects the charge density in solution. The linear PEI is provided in an amount, in which linear PEI is soluble in water after step (iv), (v), and/or (vi). Typically, a dilute solution is preferred, such as about 30 g per liter of solute (30,000 ppm) or less (e.g., 28 g/L or less, 25 g/L or less, 22 g/L or less, 20 g/L or less, 18 g/L or less, 15 g/L or less, 12 g/L or less, 10 g/L or less, 9 g/L or less, 8 g/L or less, 7 g/L or less, 6 g/L or less, 5 g/L or less, 4 g/L or less, 3 g/L or less, 2 g/L or less, 1 g/L or less, 0.5 g/L or less, 0.1 g/L or less, or 0.05 or less) of linear PEI hydrochloride. The solution generally will comprise at least 0.01 g per liter of solute (10 ppm) (e.g., at least 0.05 g/L, at least 0.1 g/L, at least 0.2 g/L, at least 0.3 g/L, at least 0.4 g/L, at least 0.5 g/L, at least 1 g/L, at least 2 g/L, at least 3 g/L, at least 4 g/L, at least 5 g/L, at least 6 g/L, at least 7 g/L, or at least 8 g/L) of linear PEI. Any two of the foregoing endpoints can be used to define a close-ended range, or a single endpoint can be used to define an open-ended range. In some embodiments, the concentration of linear PEI is about 10 to 30 g per liter of solute (e.g., about 10 to 20 g/L).

In step (ii), a base is added to the linear PEI hydrochloride in an amount sufficient to provide a linear PEI salt solution with a pH between about 7-11 (i.e., a pH of 7, 8, 9, 10, 11, or any value in between), but preferably the pH is between about 9-11 (i.e., a pH of 9, 10, 11, or any value in between). In this step, the hydrochloride is neutralized with the base to form a neutral salt in combination with the linear PEI. In some embodiments, the pH is about 10-11. When excess base is used and the pH of the solution is basic, the base form will form a salt with the organic acid in subsequent steps (e.g., sodium acetate, zinc acetate, etc.).

The base is any suitable base that neutralizes the hydrochloride in the linear PEI hydrochloride to provide a neutral salt (e.g., NaCl, KCl, $ZnCl_2$). In some embodiments, the base is a strong base that is fully ionic. Examples of a strong base include an alkali metal (Group 1 of the Periodic Table) hydroxide, an alkaline earth metal (Group 2 of the Periodic Table) hydroxide, a transition metal (any of Groups 3-12 of the Periodic Table) hydroxide, or a combination thereof. For example, the base can be sodium hydroxide, potassium hydroxide, zinc hydroxide, zinc carbonate hydroxide, or a combination thereof. Preferably, the base is sodium hydroxide.

Step (iii) is directed to adding a first organic acid to the solution obtained in step (ii) in an amount sufficient to reduce the pH to less than 7. In some embodiments, the first organic acid is added in an amount to provide a pH of about 3-6 (e.g., about 4-6, about 5-6). For example, where desalting (step (iv)) is done by electrodialysis, it has been discovered that it tends to be easier to remove the neutral salt in step (iv) if the pH is about 5-6 so that the charged linear PEI will not be unduly attracted to the anionic membrane of the electrodialysis system. Use of an organic acid is preferred over an inorganic acid, such as hydrochloric acid. In embodiments of the method, an inorganic acid (e.g., hydrochloric acid) is not added to any of the linear PEI solutions to reduce the pH to less than 7 (e.g., an inorganic acid is not added in step (iii) or step (vi)).

Typically, the first organic acid is a monocarboxylic acid (R—C(O)(OH), in which R is $C_{1-12}$ alkyl or aryl), a polycarboxylic acid, a sulfonic acid ($RS(O)_2OH$, in which R is $C_{1-12}$ alkyl or aryl), a sulfinic acid (RS(O)OH, in which R is $C_{1-12}$ alkyl or aryl), a phosphonic acid (R—$P(O)(OH)_2$, in which R is $C_{1-12}$ alkyl or aryl), and a phosphinic acid (R—P(R')(O)OH, in which R is $C_{1-12}$ alkyl or aryl and R' is H, $C_{1-12}$ alkyl, or aryl). Any of the $C_{1-12}$ alkyl and aryl groups for R and R' can be optionally substituted with one or more substituents (e.g., 1, 2, 3, 4, 5, 6, etc.) selected from alkyl, halo, alkoxy, trialkylsiloxy, nitro, and aryl.

In some embodiments, the first organic acid is a monocarboxylic acid, polycarboxylic acid, or a combination thereof. Examples of the monocarboxylic acid include, e.g., formic acid, acetic acid, propionic acid, butanoic acid, isobutyric acid, pentanoic acid, hexanoic acid, heptanoic acid, octanoic acid, decanoic acid, dodecanoic acid, and a combination thereof. Examples of the polycarboxylic acid include, e.g., citric acid, malic acid, malonic acid, maleic acid, glutaric acid, oxalic acid, fumaric acid, succinic acid, suberic acid, tartaric acid, 1,2,3,4-butane tetracarboxylic acid, and a combination thereof. In preferred embodiments, the first organic acid is acetic acid and/or formic acid, which have antimicrobial properties.

Step (iv) of the method is directed to removing about 20% to 100% of the neutral salt (e.g., NaCl, KCl, $ZnCl_2$, and/or salts of the organic acid, such as sodium acetate) from the solution obtained in step (iii). It has been discovered that removing at least a portion of the neutral salt (e.g., $X^+Cl^-$) improves the zeta potential of the linear PEI. Typically, greater amounts of salt are removed with increasing time for the desalination step. Other factors will affect the amount of salt to be removed, including the neutral salt to be removed and the type of desalination technique used. Typically, at least 20% (e.g., at least 25%, at least 30%, at least 35%, at least 40%, at least 45%, at least 50%, at least 55%, at least 60%, at least 65%, at least 70%, at least 75%, at least 80%, at least 85%, at least 90%, at least 92%, at least 95%, at least 97%, at least 98%, or at least 99%) of the salt is removed. Alternatively, or in addition, 100% or less (e.g., 99% or less, 98% or less 97% or less, 96% or less, 95% or less, 92% or less, 90% or less, 89% or less, 88% or less, 87% or less, 86% or less, 85% or less, 84% or less, 83% or less, 82% or less, 81% or less, 80% or less, 75% or less, 70% or less, 65% or less, 60% or less, 55% or less, 50% or less, 45% or less, 40% or less, 35% or less, or 30% or less) of the salt is removed. Any two of the foregoing endpoints can be used to define a close-ended range, or a single endpoint can be used to define an open-ended range. In some embodiments, about 30% to 85% of the salt is removed. Preferably, about 40% to 99% (e.g., about 40% to 95%, about 50% to about 90%, about 40% to 80%, about 40% to 70%, about 40% to 67%, about 50% to 65%, about 50%) of the salt is removed.

The amount of salt can be determined by any suitable method, such as measuring the conductivity of the PEI solution. The percentage of salt reduction is calculated by the percent change (i.e., reduction) in solution conductivity. In particular, the conductivity of the PEI solution prior to salt removal represents 100% salt. After at least some portion of salt is removed, the conductivity of the same PEI solution will be reduced, which can be used for calculating the percent salt reduction. For example, a reading of 2 microsiemens or less indicates that 99% of the salt is removed from a 4 k ppm solution of linear PEI.

The salt is removed using any suitable method, including, e.g., washing, dialysis, filtration, diafiltration, centrifugation, evaporation, crystallization, and combinations thereof. In some embodiments, the salt is removed using dialysis, such as membrane dialysis, electrodialysis, passive dialysis, Donnan dialysis using an ion-exchange membrane, or microdialysis. The membranes used in dialysis are made from any suitable semipermeable material that sufficiently separates cations and anions. In general, the membrane comprises one or more polymers selected from cellulose, modified cellulose, cellulose acetate, polycarbonate, polyacrylonitrile, polyamide, polysulfone, and polyethersulfone.

With larger scale quantities, electrodialysis typically is preferred. In electrodialysis, an external electric field is applied to the solution that accelerates mass transference across the membrane. Charged compounds are transferred, and uncharged compounds are retained. In embodiments of the method, reverse osmosis is not used as the desalination technique, since reverse osmosis would disrupt the linear PEI polymer chains.

The desalination process removes hydrogen from the solution, which will impact the pH of the solution. In some types of desalination (e.g., dialysis), the pH can be controlled before, during, or after the desalination step by, for example, adding an acid. In such scenario, the pH should be controlled to be within 2-7 (i.e., a pH of 2, 3, 4, 5, 6, 7, or any value in between).

If desired, the method can include step (v), which is directed to adding water and/or a second organic acid to the solution obtained in step (iv) to adjust the concentration and/or pH of the linear PEI solution with reduced salt content. In general, adding the second organic acid at this point provides a disinfecting composition comprising charged linear PEI with a reduced salt content, organic acid, and water, in which the disinfecting composition has a pH of about 2-7 (i.e., a pH of 2, 3, 4, 5, 6, 7, or any value in between). In certain embodiments, the second organic acid is added in an amount to provide a pH of about 3-6. Preferably, the second organic acid is added in an amount to provide a pH of about 4-5 (e.g., a pH of about 4.5). At a pH of about 4-5 (e.g., a pH of about 4.5), the disinfecting solution is tolerable to human skin, and there is sufficient acid to highly protonate the nitrogens in the linear PEI amines resulting in a significantly higher zeta charge.

The second organic acid can be the same or different from the first organic acid. Preferably, however, the second organic acid is the same as the first organic acid.

Organic acids have been shown to have antimicrobial activity, particularly against bacteria (Hirshfield et al., Science Progress, 2003, 245-269). In certain embodiments, the second organic acid is a monocarboxylic acid (R—C(O)(OH), in which R is $C_{1-12}$ alkyl or aryl), a polycarboxylic acid, a sulfonic acid ($RS(O)_2OH$, in which R is $C_{1-12}$ alkyl or aryl), a sulfinic acid (RS(O)OH, in which R is $C_{1-12}$ alkyl or aryl), a phosphonic acid (R—$P(O)(OH)_2$, in which R is $C_{1-12}$ alkyl or aryl), a phosphinic acid (R—P(R')(O)OH, in which R is $C_{1-12}$ alkyl or aryl and R' is H, $C_{1-12}$ alkyl, or aryl), or a combination thereof. Any of the $C_{1-12}$ alkyl and aryl groups for R and R' can be optionally substituted with one or more substituents (e.g., 1, 2, 3, 4, 5, 6, etc.) selected from alkyl, halo, alkoxy, trialkylsiloxy, nitro, and aryl.

In some embodiments, the second organic acid is a monocarboxylic acid, polycarboxylic acid, or a combination thereof. Examples of the monocarboxylic acid include, e.g., formic acid, acetic acid, propionic acid, butanoic acid, isobutyric acid, pentanoic acid, hexanoic acid, heptanoic acid, octanoic acid, decanoic acid, dodecanoic acid, and a combination thereof. Examples of the polycarboxylic acid include, e.g., citric acid, malic acid, malonic acid, maleic acid, glutaric acid, oxalic acid, fumaric acid, succinic acid, suberic acid, tartaric acid, 1,2,3,4-butane tetracarboxylic acid, and a combination thereof.

In preferred embodiments, the second organic acid is formic acid and/or acetic acid due to its antimicrobial activity. In some especially preferred embodiments, both the first and second organic acids are either formic acid or acetic acid. Acetic acid has excellent bactericidal effects, particularly with problematic gram-negative bacteria such as *P. vulgaris, P. aeruginosa* and *A. baumannii* (Ryssel, et al., Burns, 2009, 35(5), 695-700).

In some embodiments of the method, the method further comprises step (vi), which is directed to adding at least one metal salt to the disinfecting composition produced by method steps (i) through (iv) and optionally step (v). The at least one (e.g., 1 or more, 2 or more, 3 or more, or 4 or more, including 1, 2, 3, 4, etc.) metal salt comprises a metal cation with antimicrobial activity and an anion and is water soluble. The at least one metal salt augments the antimicrobial activity against a pathogen, such as a bacteria, virus, fungus, or a combination thereof. In general, the metal salt is water soluble.

In certain embodiments, the metal is a cation of an alkali metal (Group 1 of the Periodic Table, including Li, Na, K, Rb, and Cs), an alkaline earth metal (Group 2 of the Periodic Table, including Be, Mg, Ca, Sr, and Ba), a transition metal (any of Groups 3-12 of the Periodic Table, including Ti, Zr, V, Nb, Ta, Cr, Mo, W, Mn, Re, Fe, Ru, CO, Rh, Ir, Ni, Pd, Pt, Cu, Ag, Au, Zn, Cd, and Hg), or a post-transition metal (Groups 13 and 14 of the Periodic Table, including Al, Tl, Pb, and Sn). In certain embodiments, the metal cation comprises lithium, zinc, silver, copper, titanium, nickel, cobalt, zirconium, molybdenum, tin, or a combination thereof. In a preferred embodiment, the metal cation comprises zinc and an appropriate counterion. The anion of the at least one metal salt is any suitable anion, such as halide (e.g., fluoride, chloride, bromide, or iodide), hydroxide, acetate, nitrate, chlorate, perchlorate, sulfate, thiocyanate, sulfide, oxide, nitride, carbonate, oxalate, chromate, phosphate, or a combination thereof. In some preferred embodiments, the at least one metal salt is selected from zinc chloride, zinc acetate, copper chloride, copper sulfide, and a combination thereof.

The metal salt is added such that the total concentration of metal salts is 5 g per liter of solute (5,000 ppm) or less (e.g., 4 g/L or less, 3 g/L or less, 2 g/L or less, 1 g/L or less, 0.9 g/L or less, 0.8 g/L or less, 0.7 g/L or less, 0.6 g/L or less, 0.5 g/L or less, 0.4 g/L or less, 0.3 g/L or less, or 0.2 g/L or less). The solution generally will comprise at least 0.05 g per liter of solute (50 ppm) (e.g., at least 0.1 g/L, at least 0.15 g/L, at least 0.2 g/L, at least 0.25 g/L, at least 0.3 g/L, at least 0.4 g/L, at least 0.5 g/L, at least 0.6 g/L, at least 0.7 g/L, at least 0.8 g/L, at least 0.9 g/L, or at least 1 g/L). Any two of the foregoing endpoints can be used to define a close-ended range, or a single endpoint can be used to define an open-ended range. In some embodiments, the concentration of metal salt in the solution is about 0.1 to 2 g per liter of solute (100 to 2,000 ppm). In other embodiments, the amount of metal salt is about 0.3 g per liter of solute (300 ppm).

If necessary, an ionophore selected for the metal of the at least one metal salt can be added to the solution. An ionophore is a compound that reversibly binds ions (e.g., a metal cation) and can transport ions through a biological membrane. For example, viruses in an inoculum can be exposed to antiviral zinc ions, yet the zinc ions cannot penetrate the protein shell (capsid) of the virus. An ionophore can help the zinc penetrate the capsid and cell membrane of the virus. Zinc ionophores can form complexes within the host cell with the viral RNA or DNA, which retards the replication of the virus within the cell. Ionophores include, for example, zinc pyrithione, epigallocatechin-gallate (EGCG), 4-(2-aminoethyl)-2-methoxyphenol, 3-methoxytyramine hydrochloride, 2,6-bis(1,1-dimethylethyl)-4-methylphenol, chloroquine, hinokitiol, pyrithione dithiocarbamate (PDTC), a flavonoid (e.g., quercetin, herbacetin, rhoifolin, and pectolinarin), and a combination thereof. In some embodiments, the ionophore is 4-(2-aminoethyl)-2-methoxyphenol, which is water soluble, and/or 2,6-bis(1,1-dimethylethyl)-4-methylphenol, which is soluble in alcohol (e.g., ethanol).

When used, the ionophore is added in an amount of 0.7 g per liter of solute (700 ppm) or less (e.g., 0.6 g/L or less, 0.5 g/L or less, 0.4 g/L or less, 0.3 g/L or less, 0.2 g/L or less, 0.1 g/L or less, 0.09 g/L or less, 0.08 g/L or less, 0.07 g/L or less, 0.06 g/L or less, 0.05 g/L or less, 0.04 g/L or less, 0.03 g/L or less, or 0.02 g/L or less). The solution generally will comprise an ionophore in an amount of at least 0.005 g per liter of solute (5 ppm) (e.g., at least 0.008 g/L, at least 0.01 g/L, at least 0.015 g/L, at least 0.02 g/L, at least 0.03 g/L, or at least 0.04 g/L). Any two of the foregoing endpoints can be used to define a close-ended range, or a single endpoint can be used to define an open-ended range. In embodiments in which an ionophore is required, the concentration of ionophore in the solution is about 0.01 to 0.5 g per liter of solute (10 to 500 ppm). In other embodiments, the amount of ionophore is about 0.1 g per liter of solute (100 ppm).

In any of the embodiments above, the term "alkyl" implies a straight-chain or branched alkyl substituent containing from, for example, from about 1 to about 12 carbon atoms, e.g., from about 1 to about 10 carbon atoms, from about 1 to about 8 carbon atoms, from about 1 to about 6 carbon atoms, or from about 1 to about 4 carbon atoms. Examples of alkyl group include methyl, ethyl, n-propyl, isopropyl, n-butyl, sec-butyl, isobutyl, tert-butyl, n-pentyl, isopentyl, n-hexyl, n-heptyl, n-octyl, n-nonyl, n-decyl, n-dodecyl, and the like. The alkyl can be substituted or unsubstituted, as described herein.

In any of the embodiments above, the term "aryl" refers to a mono, bi, or tricyclic carbocyclic ring system having one, two, or three aromatic rings, for example, phenyl, naphthyl, anthracenyl, or biphenyl. The term "aryl" refers to an unsubstituted or substituted aromatic carbocyclic moiety, as commonly understood in the art, and includes monocyclic and polycyclic aromatics such as, for example, phenyl, biphenyl, naphthyl, anthracenyl, pyrenyl, and the like. Preferably, the aryl is phenyl. An aryl moiety generally contains from, for example, 6 to 30 carbon atoms, from 6 to 18 carbon atoms, from 6 to 14 carbon atoms, or from 6 to 10 carbon atoms. It is understood that the term aryl includes carbocyclic moieties that are planar and comprise $4n+2\pi$ electrons, according to Bickel's Rule, wherein n=1, 2, or 3. The aryl can be substituted or unsubstituted, as described herein.

In any of the embodiments above, the term "halo" refers to a halogen selected from fluorine, chlorine, bromine, and iodine.

In any of the embodiments above, the term "alkoxy" embrace a linear or branched alkyl group that is attached to a divalent oxygen. The alkyl group is the same as described herein.

As used herein the term "about" typically refers to ±5% of a value.

Zeta potential is the measure of the electric potential at the slipping plane in the double layer surrounding a particle suspended in solution. The double layer consists of the Stern layer and the diffuse layer. In the Stern layer, ions with the opposite charge of the particle surface are attracted to the particle. As the distance from the particle surface increases, the oppositely charged ions become more diffuse. The point where the ions start to diffuse into the surrounding medium is called the slipping plane as strongly attracted ions will move with the particle in Brownian motion. It is at the slipping plane where the zeta potential is measured. Zeta potential can be used as a measure of particle stability in a solution. Linear PEI solutions with as a high zeta potential are desirable, since higher charge is associated with great antimicrobial activity. In some embodiments, the zeta potential of the linear PEI solution is at least 30 mV (e.g., at least 35 mV, at least 37 mV, at least 40 mV, at least 42 mV, at least 45 mV, at least 47 mV, or at least 50 mV).

The method steps described herein provide a highly charged linear PEI, which translates into linear PEI with improved antimicrobial activity. Accordingly, provided is an antimicrobial composition comprising the disinfecting composition prepared by the inventive method, including steps (i) through (iv)—in combination—and optionally steps (v) and/or (vi).

In some embodiments, the disinfecting composition prepared by the method steps described herein is a concentrate that can be used in combination with other components to provide various antimicrobial formulations for a multitude of end uses. Accordingly, the antimicrobial composition can comprise components in addition to the linear PEI with reduced salt content, organic acid, optional metal salt, optional ionophore, water, and optionally an alcohol (e.g., ethanol).

Typically, an antimicrobial composition prepared from the disinfecting solution prepared by method steps (i) through (iv) and optionally steps (v) and/or (vi) comprises linear PEI with reduced salt content in an amount of 10 g per liter of solute (10,000 ppm) or less (e.g., 9 g/L or less, 8 g/L or less, 7 g/L or less, 6 g/L or less, 5 g/L or less, 4 g/L or less, 3 g/L or less, 2 g/L or less, 1 g/L or less, 0.5 g/L or less, 0.1 g/L or less, or 0.05 or less). The antimicrobial composition generally will comprise at least 0.01 g per liter of solute (10 ppm) (e.g., at least 0.05 g/L, at least 0.1 g/L, at least 0.2 g/L, at least 0.3 g/L, at least 0.4 g/L, at least 0.5 g/L, at least 1 g/L, at least 2 g/L, at least 3 g/L, at least 4 g/L, at least 5 g/L, at least 6 g/L, at least 7 g/L, or at least 8 g/L) of linear PEI with reduced salt content. Any two of the foregoing endpoints can be used to define a close-ended range, or a single endpoint can be used to define an open-ended range. In some embodiments, the concentration of linear PEI with reduced salt content in the antimicrobial composition is about 1 to 10 g per liter of solute (e.g., about 2 to 5 g/L).

In some embodiments, the antimicrobial composition is prepared by simply diluting the concentrated disinfecting composition with additional water and/or organic acid to provide the desired concentration of linear PEI with reduced salt content.

In other embodiments, the antimicrobial composition can further comprise an alcohol (e.g., methanol, ethanol, n-propanol, iso-propanol, n-butanol, sec-butanol, t-butanol, or a combination thereof). In preferred embodiments, the alcohol is ethanol or iso-propanol. More preferably, the alcohol is ethanol. When a combination of alcohol and water is used, the ratio of alcohol:water preferably ranges from 10:90 to 99:1 (e.g., 10:90, 20:80, 30:70, 40:60, 50:50, 60:40, 70:30, 80:20, 90:10, 95:5, and 99:1). In certain embodiments, the alcohol:water ratio ranges from 70:30 to 80:20.

The antimicrobial composition can further comprise a polymer that can act as a film former. Polymers that can act as film formers include, a cationic polymer, a non-ionic polymer, and cellulose, which can be neutral or have a slight negative (anionic) charge.

Examples of a suitable cationic polymer include polydiallyldialkylammonium salt, an acryloxyalkyltrialkylammonium salt (e.g., acryloxyethyltrimethylammonium halide, methacryloxyethyltrimethylammonium halide), a vinylphenalkyltrialkylammonium salt (e.g., vinylbenzyltrimethylammonium halide), an acrylamidoalkyltrialkylammonium salt (e.g., 3-acrylamido-3-methylbutyltrimethylammonium halide), a poly(acrylamide-co-diallyldialkylammonium salt) (e.g., poly(acrylamide-co-diallyldimethylammonium chloride)), a polyethylenimine-based polymer, chitosan, or a combination thereof. In any of the foregoing polymers, each alkyl group is the same or different and is a straight chain $C_{1-6}$ or branched $C_{3-6}$ (e.g., methyl, ethyl, t-butyl) group, and the salt is an anion, such as a halide (e.g., chloride, fluoride, bromide), a halide-containing anion (e.g., bis(triflouromethane)sulfonimide, trifluoroacetate), a sulfate, or a phosphate. Preferably, the disinfecting composition further comprises a polymer selected from a polydiallyldialkylammonium salt (e.g., a polydiallyldialkylammonium halide, such as polydiallyldimethylammonium chloride (polyDADMAC)), an acryloxyalkyltrialkylammonium salt, a vinylphenalkyltrialkylammonium salt, an acrylamidoalkyltrialkylammonium salt, a poly(acrylamide-co-diallyldialkylammonium salt), a polyethylenimine-based polymer, chitosan optionally in combination with an anionic polymer, and a combination thereof.

A suitable non-ionic polymer generally is a non-electrolyte polymer that is water soluble. Examples of suitable non-ionic polymers include a polyacrylamide, a polyamine, a polyamidoamine, polyethylene glycol, polyvinyl pyrrolidone, polyvinyl alcohol, a polyacrylate (e.g., poly(methyl) methacrylate), and any combination thereof.

Cellulose can be natural or synthetic and includes, for example, any polymorph of cellulose (e.g., I, II, III, and IV), cellulose composites (e.g., all cellulose composite, cellulose-starch, cellulose-polylactic acid, cellulose-polyvinyl alcohol, cellulose-chitin, and combinations thereof), and cellulose derivatives (e.g., cellulose acetate, cellulose triacetate, ethyl cellulose, methyl cellulose, hydroxyethyl cellulose, hydroxypropyl cellulose, carboxymethyl cellulose, and combinations thereof). In some preferred embodiments, the cellulose is nanocellulose (e.g., cellulose nanocrystal, cellulose nanofibers, and/or bacterial nanocellose). Nanocellulose is biodegradable, biocompatible, and non-toxic. Typically, nanocellulose has a diameter of about 1-30 nm (e.g., about 5-20 nm).

The amount of additional polymer that acts as a film former (e.g., cationic polymer, non-ionic polymer, and/or cellulose) is not particularly limited, but generally will be 20 g per liter of solute (20,000 ppm) or less (e.g., 18 g/L or less, 15 g/L or less, 12 g/L or less, 10 g/L or less, 9 g/L or less, 8 g/L or less, 7 g/L or less, 6 g/L or less, 5 g/L or less, 4 g/L or less, 3 g/L or less, or 2 g/L or less). The solution generally will comprise at least 0.1 g per liter of solute (100 ppm) (e.g., at least 0.2 g/L, at least 0.3 g/L, at least 0.5 g/L, at least 1 g/L, at least 2 g/L, at least 3 g/L, at least 4 g/L, at least 5 g/L, at least 6 g/L, at least 7 g/L, at least 8 g/L) of additional polymer. Any two of the foregoing endpoints can be used to define a close-ended range, or a single endpoint can be used to define an open-ended range. In some embodiments, the concentration of additional polymer that acts as a film former is about 0.1 to 10 g per liter of solute (100 to 10,000 ppm), including about 2.5 g/L (250 ppm).

In general, the antimicrobial composition does not comprise a germicidal small molecule compound (i.e., non-polymer), including those conventional germicidal agents that are registered with the Environmental Protection Agency (EPA), because such components have a material effect on the composition. EPA-approved germicidal agents that can be excluded from the composition include, for example, glutaral, halazone, hexachlorophene, nitrofurazone, nitromersol, povidone-iodine, thimerosol, $C_1$-$C_5$-parabens, hypochlorite salts, clofucarban, clorophen, poloxamer iodine, phenolics, mafenide acetate, aminacrine hydrochloride, quaternary ammonium salts, oxychlorosene, metabromsalan, merbromin, dibromsalan, glyceryl laurate, sodium and/or zinc pyrithione, (dodecyl)(diethylenediamine)glycine, (dodecyl)(aminopropyl)glycine, a phenolic compound, (e.g., m-cresol, o-cresol, p-cresol, o-phenyl-phenol, 4-chloro-m-cresol, chloroxylenol, 6-n-amyl-m-cresol, resorcinol, resorcinol monoacetate, p-tert-butylphenol and o-benzyl-p-chlorophenol), alkaline glutaraldehyde, and a quaternary ammonium salt (e.g., N-(higher) $C_{10}$-$C_{24}$-alkyl-N-benzyl-quaternary ammonium salts that comprise water-solubilizing anions such as halide, e.g., chloride, bromide and iodide; sulfate, and methosulfate, and the heterocyclicimides such as the imidazolinium salts). Quaternary ammonium compounds are described in U.S. Pat. No. 8,067, 403 and include: benzalkonium chlorides (e.g., benzalkonium chloride), substituted benzalkonium chlorides (e.g., alkyl dimethyl benzyl ammonium chloride), dual quaternary ammonium compounds (e.g., contain an equal mixture of alkyldimethyl benzyl ammonium chloride and alkyl dimethyl ethylbenzyl ammonium chloride), twin or dual chain quaternary ammonium compounds, such as dialkylmethyl amines (e.g., didecyl dimethyl ammonium chloride or dioctyldimethyl ammonium chloride), and mixtures of fourth generation quaternary ammonium compounds with second-generation quaternary ammonium compounds (e.g., didecyl dimethyl ammonium chloride with alkyl dimethyl benzyl ammonium chloride).

However, if desired, one or more additional chemical germicidal agents, such as those agents described above, can be added to any of the foregoing embodiments of the antimicrobial composition. This option provides an additional chemical killing mechanism to further enhance the antimicrobial activity of the composition. In an embodiment, the germicide is at least one member selected from the group consisting of sodium hypochlorite, chloride, chlorine dioxide, potassium persulfate, potassium permanganate, chlordexidine, hexachlorophene, hydrogen peroxide, peracetic acid, betadine, povidone iodine, formaldehyde, glutaraldehyde, benzalkonium chloride, triclosan, boric acid, phenol, cresylic acid, thymol, and polyhexamethylbiguanide.

When used, the germicidal agents are typically added in lower concentrations, such as 0.7 g per liter of solute (700 ppm) or less (e.g., 0.6 g/L or less, 0.5 g/L or less, 0.4 g/L or less, 0.3 g/L or less, 0.2 g/L or less, 0.1 g/L or less, 0.09 g/L or less, 0.08 g/L or less, 0.07 g/L or less, 0.06 g/L or less, 0.05 g/L or less, 0.04 g/L or less, 0.03 g/L or less, or 0.02 g/L or less). The solution generally will comprise germicidal agents in an amount of at least 0.005 g per liter of solute (5 ppm) (e.g., at least 0.008 g/L, at least 0.01 g/L, at least 0.015 g/L, at least 0.02 g/L, at least 0.03 g/L, or at least 0.04 g/L). Any two of the foregoing endpoints can be used to define a close-ended range, or a single endpoint can be used to define an open-ended range.

If desired, the antimicrobial composition can contain other components that include, for example, propylene glycol, a thickening agent (e.g., polyacrylic acid), a humectant (e.g., glycerine, aloe vera), an essential oil (e.g., tea tree oil), fruit extract, fragrance (e.g., carbomer, aminomethyl propanol, isopropyl myristate, tocopheryl acetate), and/or dye (e.g., blue 1, red 33, yellow 5).

Depending on the carrier, polymers used, and presence of additional components, the antimicrobial composition can be in any desirable formulation, including a liquid, a solution, a suspension, a cream, a gel, a foam, or an aerosol.

The antimicrobial activity of the antimicrobial composition can be measured by any suitable test. For example, Protocol #01-1A, commonly known as "the Clorox test," is a method approved by the EPA for measuring long-term sanitization claims (i.e., "kill later" durability claim). Protocol #01-1A, the entire contents of which are incorporated by reference, measures the residual antimicrobial activity of dried chemical residues (films) on inanimate, hard, non-porous surfaces against only bacteria: *Staphylococcus aureus, Klebsiella pneumoniae*, and/or *Enterobacter aerogenes*. In particular, surfaces are inoculated, treated with test product, allowed to dry, then abraded under alternating wet and dry conditions, which are interspersed with several re-inoculations. At the end of the study and at least 24 hours later, the ability of the test surfaces to kill 99.9% of microorganisms within 5 minutes is measured. To pass this test, a film formed from the composition must maintain its antimicrobial efficacy between, and after, 12 alternating cycles of wet rubs (6) and dry rubs (6) with a weighted cloth, each rub cycle consisting of 2 passes over the surfaces for a total of 24 passes.

The invention also provides a method of disinfecting a surface (e.g., killing microbes on a surface) comprising applying to the surface the antimicrobial composition in accordance with any of embodiments described herein. The method can include disinfecting a surface, providing a residual antimicrobial film, or both. As used herein, the term "disinfecting" means reducing the amount of microbes on the surface in contact with the antimicrobial composition relative to the content of microbes before the antimicrobial composition was applied. Microbes includes any single cell or multicellular organism, such as bacteria, viruses, fungi, archaea, and protists (e.g., algae, amoebas, protozoa).

The term "applying" refers to any suitable technique used to transfer the antimicrobial composition to a surface. For example, techniques for applying can be, but are not limited to, brushing, rolling, spraying, wiping, mopping, pouring, painting, absorbing, adsorbing, imbibing, soaking, saturating, permeating, immersing, and a combination of these methods.

Once applied to the surface, the solvent (e.g., water and optionally alcohol) in the antimicrobial composition evaporates to leave an antimicrobial residual film on the surface. The antimicrobial residual film renders the surface bactericidal, virucidal, and/or germicidal. As used herein, the term "renders the surface bactericidal, virucidal, and/or germicidal" refers to reducing (e.g., eliminating, killing, or preventing and/or inhibiting growth) the presence of bacteria, viruses, and/or germs (including a fungus, such as *Aspergillas brasliensis*) to any suitable degree. As used herein, the term "any suitable degree" refers to 50% reduction or more, including 60% reduction or more, 70% reduction or more, 80% reduction or more, 90% reduction or more, 92% reduction or more, 94% reduction or more, 95% reduction or more, 97% reduction or more, 98% reduction or more, 99% reduction or more, or 99.5% elimination or more.

In accordance with this embodiment, the invention provides a coated surface comprising a surface (e.g., a surface of a substrate) and an antimicrobial residual film formed from the antimicrobial composition that is applied to the surface. The resulting film provides a non-leaching surface that is not easily removed with contact (e.g., rubbing) yet readily removed by washing with a solvent (e.g., soapy water). In most embodiments, the antimicrobial residual film is attracted to but not covalently bound to the surface (e.g., surface of the substrate).

The surface that is rendered bactericidal, virucidal, and/or germicidal can be of any suitable material, including a biocompatible material. The surface can be used in or derived from any suitable form, such as, for example, a powder, dust, an aggregate, an amorphous solid, a sheet, a fiber, a tube, a fabric, a textile, or the like. In embodiments, the surface comprises metal, glass, fiberglass, silica, sand, wood, fiber, natural polymer, synthetic polymer or copolymer, plastic, rubber, ceramic, porcelain, stone, marble, cement, a mammalian body (e.g., skin), mammalian tissue, or a combination thereof.

Metal surfaces suitable for use in the invention include, for example, stainless steel, nickel, titanium, tantalum, aluminum, copper, gold, silver, platinum, zinc, nickel titanium alloy (nitinol), an alloy of nickel, chromium, and iron (INCONEL™, Special Metals, Corporation, Elkhart, Ind.), iridium, tungsten, silicon, magnesium, tin, galvanized steel, hot dipped galvanized steel, electrogalvanized steel, annealed hot dipped galvanized steel, alloys of any of the foregoing metals, coatings containing any of the foregoing metals, and combinations thereof.

Glass surfaces suitable for use in the invention include, for example, soda lime glass, strontium glass, borosilicate glass, barium glass, glass-ceramics containing lanthanum, fiber glass, and combinations thereof.

Silica surfaces suitable for use in the invention include, for example, quartz, fused quartz, crystalline silica, fumed silica, silica gel, silica aerogel, and mixtures thereof.

Sand surfaces suitable for use in the invention include, for example, sand comprised of silica (e.g., quartz), calcium carbonate (e.g., aragonite), and mixtures thereof.

The sand can comprise other components, such as minerals (e.g., magnetite, chlorite, glauconite, gypsum, olivine, garnet), metal (e.g., iron), shells, coral, limestone, and/or rock.

Suitable wood surfaces include, for example, hard wood and soft wood, and materials engineered from wood, wood chips, or fiber (e.g., plywood, oriented strand board, laminated veneer lumber, composites, strand lumber, chipboard, hardboard, medium density fiberboard), and combinations thereof. Types of wood include alder, birch, elm, maple, willow, walnut, cherry, oak, hickory, poplar, pine, fir, and combinations thereof.

Fiber surfaces suitable for use in the invention include, for example, natural fibers (e.g., derived from an animal, vegetable, or mineral) and synthetic fibers (e.g., derived from cellulose, mineral, or polymer). Suitable natural fibers include cotton, hemp, jute, flax, ramie, sisal, bagasse, wood fiber, silkworm silk, spider silk, sinew, catgut, wool, sea silk, wool, mohair, angora, and asbestos. Suitable synthetic fibers include rayon (e.g., lyocell), modal, and metal fiber (e.g., copper, gold, silver, nickel, aluminum, iron), carbon fiber, silicon carbide fiber, bamboo fiber, seacell, nylon, polyester, polyvinyl chloride fiber (e.g., vinyon), polyolefin fiber (e.g., polyethylene, polypropylene), acrylic polyester fiber, aramid (e.g., TWARON™, KEVLAR™, or NOMEX™), spandex, and combinations thereof.

Natural polymer surfaces suitable for use in the invention include, for example, a polysaccharide (e.g., cotton, cellulose), shellac, amber, wool, silk, natural rubber, a biopolymer (e.g., a protein, an extracellular matrix component, collagen), and combinations thereof.

Synthetic polymer surfaces suitable for use in the invention include, for example, polyvinylpyrrolidone, acrylics, acrylonitrile-butadiene-styrene, polyacrylonitrile, acetals, polyphenylene oxides, polyimides, polystyrene, polypropylene, polyethylene, polytetrafluoroethylene, polyvinylidene fluoride, polyvinyl chloride, polyethylenimine, polyesters, polyethers, polyamide, polyorthoester, polyanhydride, polysulfone, polyether sulfone, polycaprolactone, polyhydroxybutyrate valerate, polylactones, polyurethanes, polycarbonates, polyethylene terephthalate, as well as copolymers and combinations thereof.

Typical rubber surfaces suitable for use in the invention include, for example, silicones, fluorosilicones, nitrile rubbers, silicone rubbers, polyisoprenes, sulfur-cured rubbers, butadiene-acrylonitrile rubbers, isoprene-acrylonitrile rubbers, and combinations thereof.

Ceramic surfaces suitable for use in the invention include, for example, boron nitrides, silicon nitrides, aluminas, silicas, combinations thereof, and combinations thereof.

Stone surfaces suitable for use in the invention include, for example, bauxite, calcite, feldspar, gypsum, slate, granite, quartz, quartzite, limestone, dolostone, sandstone, marble, soapstone, serpentine and combinations thereof.

For purposes of the present invention, animal bodies include, but are not limited to, the order Rodentia (e.g., mice), the order Logomorpha (e.g., rabbits), the order Camivora (e.g., Felines (cats) and Canines (dogs)), the order Artiodactyla (e.g., Bovines (cows) and Swines (pigs)), the order Perssodactyla (e.g., Equines (horses)), the order Primates, Ceboids, or Simioids (e.g., monkeys), the class Ayes (e.g., birds), the class of Phylum Arthropoda (e.g., insects), the class of Pisces (e.g., fish), or the order Anthropoids (e.g., humans and apes). Typically skin (including intact skin, wounded or broken skin, and/or skin that is otherwise damaged, by for example, a burn) and/or mucosal tissue (e.g., oral, nasal, ocular, or genital tissue) of the animal body serves as the surface suitable for application of the antimicrobial composition. The skin and/or mucosal tissue can be associated with any part of the animal body, including the limbs, tail, abdomen, chest, head, neck, face, genital area (e.g., udder), buttocks, or back. In general, the type and amount of components of the antimicrobial composition will be selected to ensure biocompatibility, to minimize toxicity, to minimize irritation, and/or have a desired level of surface tack and/or adhesiveness of the formed film.

The surface typically is a component of a larger structure. For example, the surface can be part of a substrate, such as a medical device, diagnostic equipment, implant, glove, mask, curtain, mattress, sheets, blankets, gauze, dressing, tissue, surgical drape, tubing, surgical instrument, safety gear, fabric, apparel item, floor, handles, wall, sink, shower or tub, toilet, furniture, wall switch, toy, athletic equipment, playground equipment, shopping cart, countertop, appliance, railing, door, air filter, pipe, utensil, dish, cup, container, object display container, food, food display container, food package, food processing equipment, food handling equipment, food transportation equipment, food vending equipment, food storage equipment, food packaging equipment, plant, phone, cell phone, remote control, computer, mouse, keyboard, touch screen, leather, cosmetic, cosmetic making equipment, cosmetics storage equipment, cosmetics packaging equipment, personal care item, personal care item making equipment, personal care storage equipment, personal care packaging equipment, animal care item, animal care item making equipment, veterinary equipment, powder, cream, gel, salve, eye care item, eye care item making equipment, contact lens, glasses, eye care storage equipment, contact lens case, jewelry, jewelry making equipment, jewelry storage equipment, animal housing, farming equipment, animal food handling equipment, animal food storage space, animal food storage equipment, animal food container, air vehicle, land vehicle, air processing equipment, air filter, water vehicle, water storage space, water storage equipment, water processing equipment, water storage container, water filter, hand, hair, foot, leg, arm, torso, head, or animal body part, pharmaceuticals display container, pharmaceuticals package, pharmaceuticals processing equipment, pharmaceuticals handling equipment, pharmaceuticals transportation equipment, pharmaceuticals vending equipment, pharmaceuticals, pharmaceuticals storage equipment, pharmaceuticals packaging equipment.

A "medical device" includes any device having surfaces that contact tissue, blood, or other bodily fluids in the course of their use or operation, which are found on or are subsequently used within a mammal (e.g., a human). Medical devices include, for example, extracorporeal devices for use in surgery, such as blood oxygenators, blood pumps, blood storage tubes, blood collection tubes, blood filters including filtration media, dialysis membranes, tubing used to carry blood and the like which contact blood which is then returned to the patient or mammal. Medical devices also include endoprostheses implanted in a mammal (e.g., a human), such as vascular grafts, stents, pacemaker leads, surgical prosthetic conduits, heart valves, and the like, that are implanted in blood vessels or the heart. Medical devices also include devices for temporary intravascular use such as catheters, guide wires, amniocentesis and biopsy needles, cannulae, drainage tubes, shunts, sensors, transducers, probes and the like which are placed into the blood vessels, the heart, organs or tissues for purposes of monitoring or repair or treatment. Medical devices also include prostheses such as artificial joints such as hips or knees as well as artificial hearts. In addition, medical devices include penile implants, condoms, tampons, sanitary napkins, ocular lenses, sling materials, sutures, hemostats used in surgery, antimicrobial materials, surgical mesh, transdermal patches, and wound dressings/bandages.

The "diagnostic equipment" includes any device or tool used to diagnose or monitor a medical condition. Examples include an ultrasound, magnetic resonance imaging (MRI) machine, positron emission tomography (PET) scanner, computed tomography (CT) scanner, ventilator, heart-lung machine, extracorporeal membrane oxygenation (ECMO) machine, dialysis machine, blood pressure monitor, otoscope, ophthalmoscope, stethoscope, sphygmomanometer, blood pressure cuff, electrocardiograph, thermometer, defibrillator, speculum, sigmoidoscope, and anoscope.

The "surgical instrument" includes any tool or device used for performing surgery or an operation. Examples include a scalpel, lancet, trocar, hemostat, grasper, forceps, clamp, retactor, distractor, positioner, tracheotome, dilator, stapler, irrigation needle, injection needle, drill, scope, endoscope, probe, ruler, and caliper.

"Safety gear" includes devices used to protect a person, animal, or object. Examples of "safety gear" are a mask, face shield, visor, goggles, glasses, gloves, shoe covers, foot guard, leg guard, belt, smock, apron, coat, vest, raingear, hat, helmet, chin strap, hairnet, shower cap, hearing protection (ear plugs, ear muffins, hearing bands), respirator, gas mask, supplied air hood, collar, leash, and first aid kit.

"Fabric" includes any type of suitable fabric, such as clothing (e.g., hospital gowns, medical scrubs), face masks, bedding, curtains, towels, table coverings, protective sheeting, and dish cloths.

An "apparel item" includes an item of clothing, footwear, or other item someone would wear on his/her person. Examples include a uniform, coat, shirt, pants, waders, scrubs, socks, shoe or boot liner, an insole, gloves, hats, shoes, boots, and sandals.

The surface can be part of a building structure or an item that can be found in a building structure, such as a floor, wall, an appliance (e.g., a refrigerator, oven, stove, dishwasher, washing machine, clothes dryer, furnace, water heater, air conditioner, heater), sink, shower or tub, toilet, furniture (e.g., mattress, couch, sofa, chair, table, shelf, mantle, bed, dresser), countertop, railing, air filter, air processing equipment, water processing equipment, water filter, pipe, door, handle, light, light switch, thermostat, sprinkler, air conditioner evaporator and/or condenser.

The surface can also be a toy or athletic equipment, including exercise equipment, playground equipment, or a pool.

The surface can be a utensil (e.g., knife, fork, spoon, ladle, spatula, whisk, etc.), a dish (e.g., a food storage container, a food serving piece, etc.), a food package (e.g., a bag, a box, foil, plastic wrap), or other item that comes in contact with food (e.g., a cutting board, food display container, food processing equipment, food handling equipment, food transportation equipment, food vending equipment, animal food handling equipment, animal food storage space, food storage equipment, animal food container, animal food storage equipment). The surface can be part of food processing equipment, such as food processing tanks, stirrers, conveyor belts, knives, grinders, packaging machines, labeling machines, etc.

The "food" is any food in which it would be desirable to provide with an antimicrobial residual film. In such embodiments, the antimicrobial residual film and the composition thereof should be nontoxic for human and animal consumption. The "food" can be, e.g., any fruit, vegetable, meat, or egg.

The "plant" is any suitable plant, including an angiosperm (a flowering plant), gymnosperm (a seed-producing plant), a conifer, fern, and moss. Suitable angiosperms are from the *Amborella* (e.g., *Amborella trichopoda Baill*), nymphaeales (e.g., water lily), austrobaileyales (e.g., *Illicium verum*), chloranthales (e.g., from the genus *Ascarina, Chloranthus, Hedyosmum*, or *Sarcandra*), magnoliids (e.g., *magnolia*, bay laurel, black pepper), monocots (e.g., grasses, orchids, palms), ceratophyllum (e.g., aquatic plants), or eudicots (e.g., sunflower, petunia, apple) groups. Suitable gymnosperms are from the subclass cycadidae, ginkgoidae, gnetidae, or pinidae.

The surface can be part of an electronic device, such as a phone, cell phone, remote control, computer, mouse, keyboard, and touch screen.

The surface can further be part of a cosmetic (e.g., eye shadow, eyeliner, primer, foundation, lipstick, lip gloss, blush), cosmetic making equipment, cosmetic storage equipment, cosmetic packaging equipment, a personal care item (e.g., cream, gel, salve, lip balm, body soap, facial soap, lotion, cologne, perfume, antiperspirant, deodorant, facial tissue, cotton swabs, cotton pads, mouthwash, toothpaste, nail polish, shampoo, conditioner, hairspray, talcum powder, shaving cream, contact lens, contact lens case, glasses), personal care item making equipment, personal care storage equipment, personal care packaging equipment, jewelry (e.g., necklace, ring, earring, bracelet, watch), jewelry making equipment, or jewelry storage equipment.

The "animal care item" and "veterinary equipment" can be any product used in a setting that includes animals, such as a house, boarding house, or veterinary hospital. Of course, veterinary equipment can be used at a location outside of a hospital setting. Animals are any animals that are typically considered pets, non-pets, boarded, treated by a veterinarian, and animals in the wild. Examples include a dog, cat, reptile, bird, rabbit, ferret, guinea pig, hamster, rat, mouse, fish, turtle, horse, goat, cattle, and pigs. Suitable animal care items include the personal care items described herein, toys, bed, crate, kennel, carrier, bowl, dish, leash, collar, litterbox, and grooming items (e.g., clippers, scissors, a brush, comb, dematting tool, and deshedding tool). Suitable veterinary equipment includes any of the medical devices and surgical instruments described herein and other equipment, such as a table, tub, stretcher, sink, scale, cage, carrier, and leash.

The "animal housing" can be any suitable housing, such as a coop, stable, shelter, grab bag shelter, hutch, barn, shed, pen, nestbox, feeder, stanchion, cage, carrier, or bed.

The "farming equipment" is any device used in an agricultural setting, including a farm or ranch, particularly a farm or ranch that houses animals, processes animals, or both. Animal livestock that can be housed or processed as described herein and include, e.g., horses, cattle, bison, and small animals such as poultry (e.g., chickens, quails, turkeys, geese, ducks, pigeons, doves, pheasants, swan, ostrich, guineafowl, Indian peafowl, emu), pigs, sheep, goats, alpacas, llamas, deer, donkeys, rabbits, and fish. Examples of farming equipment include as a wagon, trailer, cart, barn, shed, fencing, sprinkler, shovel, scraper, halter, rope, restraining equipment, feeder, waterer, trough, water filter, water processing equipment, stock tank, fountain, bucket, pail, hay rack, scale, poultry flooring, egg handling equipment, a barn curtain, tractor, seeder, planter, plow, rotator, tiller, spreader, sprayer, agitator, sorter, baler, harvester, cotton picker, thresher, mower, backhoe loader, squeeze chute, hydraulic chute, head chute, head gate, crowding tub, corral tub, alley, calving pen, calf table, and milking machine.

The surface can be part of a vehicle, such as an air vehicle, land vehicle, or water vehicle. Suitable vehicles include a car, van, truck, bus, ambulance, recreational vehicle, camper, motorcycle, scooter, bicycle, wheelchair, train, streetcar, ship, boat, canoe, submarine, an unmanned underwater vehicle (UUV), a personal water craft, airplane, jet, helicopter, unmanned autonomous vehicle (UAV), and hot air balloon.

If desired, the surface to which the antimicrobial residual film has been applied can be regenerated by removing the antimicrobial residual film, since the film typically is not covalently bonded to the surface. The removing step can be performed by any suitable method, such as washing or rinsing with a solvent (e.g., water and/or alcohol). Thus, the antimicrobial coating on a surface (e.g., the surface of a substrate) described herein can be considered temporary (e.g., removable). In an embodiment, the antimicrobial residual film is water soluble and is removable with water (e.g., hot soapy water).

The antimicrobial residual film renders the surface bactericidal against any suitable bacteria to any suitable degree. In other words, an antimicrobial composition of the present invention can form an antimicrobial residual film on a surface (e.g., the surface of a substrate) that kills at least 75% (e.g., at least 80%, at least 85%, at least 90%, at least 92%, at least 94%, at least 95%, at least 96%, at least 97%, at least 98%, at least 99%, at least 99.5%, preferably 99.9%) of bacteria that comes in contact with the antimicrobial residual film. For example, the bacteria can be, for example, *Staphylococcus aureus*, gram positive methicillin-resistant *Staphylococcus aureus* (MRSA), *Staphylococcus saprophyticus, Pseudomonas aeruginosa, Listeria monocytogenes, Klebsiella pneumoniae, Streptococcus pneumoniae, Streptococcus pyogenes, Streptococcus agalactiae, Haemophilus influenzae, Helicobacter pylori, Salmonella, Shigella, Clostridium, Enterobacter aerogenes*, gram negative *Escherichia coli, Clostridium difficile*, or a combination thereof. In certain embodiments, the antimicrobial composition is effective in reducing (e.g., eliminating, killing, or preventing and/or inhibiting growth) gram positive methicillin-resistant *Staphylococcus aureus* (MRSA), gram negative *Escherichia coli* (ATCC 8739), *Clostridium difficile* (ATCC 43598), or a combination thereof.

In an aspect of the invention, an antimicrobial residual film formed from an antimicrobial composition described herein renders the surface bactericidal against gram positive methicillin-resistant *Staphylococcus aureus* (MRSA) bacteria. Preferably, the antimicrobial residual film kills at least 95% (e.g., at least 96%, at least 97%, at least 98%, at least 99%) of a log 5 population of gram positive methicillin-resistant *Staphylococcus aureus* (MRSA) bacteria within 30 minutes (e.g., within 20 minutes, within 15 minutes, within 10 minutes, within 5 minutes) of contact. In a particularly preferred embodiment, the antimicrobial residual film kills at least 99.9% of a log 5 population of gram positive methicillin-resistant *Staphylococcus aureus* (MRSA) bacteria within 5 minutes of contact, in accordance with the EPA #01-1A durability protocol (e.g., 24 rub passes, as described herein).

In another aspect of the invention, an antimicrobial residual film formed from an antimicrobial composition described herein renders the surface bactericidal against gram negative *Enterobacter aerogenes* (also known as *Klebsiella aerogenes*) (ATCC 13048) bacteria. In particular, the antimicrobial residual film kills at least 95% (e.g., at least 96%, at least 97%, at least 98%, at least 99%, at least 99.5%, at least 99.9%) of a log 5 population of gram negative *Enterobacter aerogenes* (ATCC 13048) bacteria within 30 minutes (e.g., within 20 minutes, within 15 minutes, within 10 minutes, within 5 minutes) of contact. In a preferred embodiment, the antimicrobial residual film kills at least 99.99% of a log 5 population of gram negative *Enterobacter aerogenes* (ATCC 13048) bacteria within 5 minutes of contact, in accordance with the EPA #01-1A durability protocol (e.g., 24 rub passes, as described herein).

In yet another aspect of the invention, an antimicrobial residual film formed from an antimicrobial composition described herein renders the surface bactericidal against *Clostridium difficile* (ATCC 43598) bacteria. More specifically, the antimicrobial residual film kills at least 75% (e.g., at least 80%, at least 85%, at least 90%, at least 95%, at least 97%, at least 98%, at least 99%) of a log 4 population of *Clostridium difficile* (ATCC 43598) bacteria within 24 hours of contact (e.g., within 18 hours, within 12 hours, within 10 hours, within 8 hours, within 6 hours) of contact.

Viruses are much more difficult to kill, especially non-enveloped viruses. Generally, the only way to kill an array of viruses is with an abundance of very harsh chemicals such as hypochlorite, acids and peroxides, all of which are extremely cytotoxic. Remarkably, the technology described in the present invention is capable of forming antimicrobial residual films that kill viruses. Accordingly the present invention provides an antimicrobial residual film formed from an antimicrobial composition described herein that renders a surface virucidal against any suitable virus to any suitable degree, such as, reducing (e.g., eliminating, killing, or preventing and/or inhibiting growth) at least 75% (e.g., at least 80%, at least 85%, at least 90%, at least 92%, at least 94%, at least 95%, at least 96%, at least 97%, at least 98%, at least 99%, or at least 99.5%) of the virus. In a particular example, an antimicrobial residual film formed from an antimicrobial composition described herein renders the surface virucidal against at least one virus (e.g., chickenpox virus, influenza, herpes simplex, a coronavirus (e.g., 229E, NL63, OC43, HKU1, MERS-CoV, SARS-CoV, and SARS-CoV-2), flavivirus, togavirus, levivirus (MS2), norovirus, rotavirus, adenovirus, parvovirus, and poliovirus).

One embodiment of the invention is directed to applying the antimicrobial composition, as described herein, to mammalian (e.g., human) skin. In such embodiment, the antimicrobial composition is considered a hand sanitizer. Preferably, the hand sanitizer is an antimicrobial composition prepared in accordance with method steps (i) through (iv) and optionally steps (v) and/or (vi) and comprising linear PEI with a reduced salt content, organic acid (e.g., formic acid, acetic acid), an alcohol (e.g., ethanol), and water. In some embodiments, the antimicrobial hand sanitizer composition further comprises at least one metal salt, such as copper chloride, and zinc acetate, and optionally an ionophore for zinc (e.g., EGCG, 4-(2-aminoethyl)-2-methoxyphenol, and/or 2,6-bis(1,1-dimethylethyl)-4-methylphenol). For use as a hand sanitizer, the antimicrobial composition preferably has a pH of about 4-5 (e.g., about pH 4.5).

The invention provides a treated textile (e.g., a fabric or cloth) prepared by applying the antimicrobial composition, as described herein, to a textile. The antimicrobial composition is dried to remove the volatile carrier (e.g., water and/or alcohol) to provide a coated, antimicrobial textile. In general, the textile can be woven or non-woven and can be natural (e.g., wool, cotton, rayon, hemp, and/or flax), synthetic (e.g., polyesteracrylic, polyester, spandex, nylon, aramid, and/or polyolefin), or a combination of natural and synthetic. In a preferred embodiment, the textile is of a material that forms negative charges.

In an example, the treated textile is a filter, such as a face mask, that has been soaked in the antimicrobial composition for a suitable time period, and then dried to form a coating. The filter medium is suitable for filtering, for example, a non-aqueous liquid or air and can be made from any suitable material, such as alumina ($Al_2O_3$), polyester (e.g., PET), polyethylene, polypropylene, polyurethane, polyvinyl chloride (PVC), polyamide (e.g., nylon 6,6), polyimide, polyacrylic, glass, metal, dextran, cellulose, jute, wood pulp, cotton, or a combination thereof (e.g., microglass fibers and/or cellulose coated with nanoalumina fibers).

Non-woven filter media can be purchased commercially or prepared by any suitable method (e.g., wetlaid, airlaid, drylaid, melt-blown, spunbond, nanofiber web spinning, and continuous draw fiberization). See, e.g., Argonide (Sanford, Fla.), Pall Corporation (Port Washington, N.Y.), GE Infrastructure Water and Process Technologies (Trevose, Pa.), and Meissner Filtration Products (Camarillo, Calif.). In a particular embodiment, the filter is made of polypropylene, such as electrostatic, melt-blown polypropylene fibers. Such filter forms the basis of, for example, an N95 respirator (3M, St. Paul, Minn.).

In yet another example, the antimicrobial composition is applied to a load of textiles during a wash cycle. Accordingly, the antimicrobial composition is added as a rinse aid to the washing machine cycle to treat the textiles and provide antimicrobial activity to the freshly laundered textiles. The textiles to be treated are as described herein. In such embodiment, an antimicrobial composition preferably comprises linear PEI with a reduced salt content, organic acid (e.g., formic acid, acetic acid), polyDADMAC, and water.

In another example, the antimicrobial composition is applied to (e.g., sprayed onto, soaked in solution) a textile, such as a face mask, hospital gown, or medical scrubs, to provide a treated textile capable of killing microbes that come in contact with the treated surface. The textile is as described herein.

In another embodiment, because linear PEI is non-toxic, the surface to be treated is mammalian (e.g., human) tissue, especially tissue in contact with a bacterial or viral infection. For example, the antimicrobial composition can be applied to tissues of the nose, mouth, pharynx, larynx, trachea, bronchi, and/or lungs.

In an embodiment of treating mammalian tissue, it is envisioned that the antimicrobial composition, alone or in combination with other suitable components, can be made into aerosol formulations to be administered to a subject in need thereof via inhalation. These aerosol formulations can be placed into a metered dose inhaler (MDI) along with one or more pressurized acceptable propellants. Suitable propellants include, e.g., a fluorinated hydrocarbon (e.g., trichloromonofluoromethane, dichlorodifluoromethane, chlorodifluoromethane, chlorodifluoroethane, dichlorotetrafluoroethane, heptafluoropropane, tetrafluoroethane, difluoroethane), a hydrocarbon (e.g., propane, butane, isobutane), or a compressed gas (e.g., nitrogen, nitrous oxide, carbon dioxide). The antimicrobial composition also may be formulated for non-pressurized preparations, such as in a nebulizer or an atomizer, for inhalation.

The subject in need thereof has been diagnosed with or suspected of having a bacterial or viral infection. Examples of bacterial infections include, e.g., pneumonia, sinusitis, bronchitis, bacterial meningitis, urinary tract infection, or an infection caused by *Staphylococcus aureus*, gram positive methicillin-resistant *Staphylococcus aureus* (MRSA), *Staphylococcus saprophyticus, Pseudomonas aeruginosa, Listeria monocytogenes, Klebsiella pneumoniae, Streptococcus pneumoniae, Streptococcus pyogenes, Streptococcus agalactiae, Haemophilus influenzae, Helicobacter pylori, Salmonella, Shigella, Clostridium, Enterobacter aerogenes*, gram negative *Escherichia coli*, and/or *Clostridium difficile*. Examples of viral infections include, e.g., influenza virus, a coronavirus (e.g., SARS, MERS, COVID), pneumonia, rhinovirus, norovirus, rotavirus, respiratory syncytial virus (RSV), the common cold, etc.).

For purposes of the present invention, the term "subject" typically is directed to a mammal. Mammals include, but are not limited to, the order Rodentia, such as mice, and the order Logomorpha, such as rabbits. In some aspects, the mammals are from the order Carnivora, including Felines (cats) and Canines (dogs), Artiodactyla, including Bovines (cows) and Swines (pigs) or of the order Perssodactyla, including Equines (horses). In some aspects, the mammals are of the order Primates, Ceboids, or Simioids (monkeys) or of the order Anthropoids (humans and apes). In embodiments of the invention, the subject in need thereof is a human.

The invention is further illustrated by the following embodiments.

Embodiment (1) A method of preparing a disinfecting composition comprising charged polyethylenimine (PEI), the method comprising: (i) providing an aqueous solution comprising a linear PEI hydrochloride solution, (ii) adding a base in an amount to provide a linear PEI salt solution with a pH between 7-11, (iii) adding a first organic acid to the solution obtained in (ii) to reduce the pH to less than 7, (iv) removing about 20% to 100% of the salt from the solution obtained in (iii), and then (v) optionally adding water and/or a second organic acid to the solution obtained in (iv) to obtain the disinfecting composition with a pH of 2-7.

Embodiment (2) The method of embodiment 1 further comprising (vi) adding at least one metal salt to the disinfecting composition comprising charged linear PEI with reduced salt content, organic acid, and water.

Embodiment (3) The method of embodiment 1 or 2, wherein the linear PEI hydrochloride has a number average molecular weight of 1,000 g/mol or more.

Embodiment (4) The method of any one of embodiments (1)-(3), wherein the linear PEI hydrochloride has a number average molecular weight of 2,000,000 g/mol or less.

Embodiment (5) The method of any one of embodiments (1)-(4), wherein the concentration of linear PEI hydrochloride is about 30 g per liter of solute or less.

Embodiment (6) The method of any one of embodiments (1)-(5), wherein the base is a strong base.

Embodiment (7) The method of embodiment (6), wherein the strong base is an alkali metal hydroxide, an alkaline earth metal hydroxide, a transition metal hydroxide, or a combination thereof.

Embodiment (8) The method of any one of embodiments (1)-(7), wherein the base is sodium hydroxide, potassium hydroxide, zinc hydroxide, zinc carbonate hydroxide, or a combination thereof.

Embodiment (9) The method of any one of embodiments (1)-(8), wherein the first organic acid is a monocarboxylic acid.

Embodiment (10) The method of embodiment (9), wherein the monocarboxylic acid is selected from formic acid, acetic acid, propionic acid, butanoic acid, isobutyric acid, pentanoic acid, hexanoic acid, heptanoic acid, octanoic acid, decanoic acid, dodecanoic acid, and a combination thereof.

Embodiment (11) The method of any one of embodiments (1)-(10), wherein the first organic acid is acetic acid.

Embodiment (12) The method of any one of embodiments (1)-(11), wherein the first organic acid is added in an amount to provide a pH of about 4-6.

Embodiment (13) The method of embodiment (12), wherein 40% to 80% of the salt is removed.

Embodiment (14) The method of any one of embodiments (1)-(13), wherein the salt is removed using dialysis.

Embodiment (15) The method of any one of embodiments (1)-(14), wherein the second organic acid is a monocarboxylic acid.

Embodiment (16) The method of embodiments (15), wherein the monocarboxylic acid is selected from formic acid, acetic acid, propionic acid, butanoic acid, isobutyric acid, pentanoic acid, hexanoic acid, heptanoic acid, octanoic acid, decanoic acid, dodecanoic acid, and a combination thereof.

Embodiment (17) The method of any one of embodiments (1)-(16), wherein the second organic acid is acetic acid.

Embodiment (18) The method of any one of embodiments (1)-(17), wherein the second organic acid is added in an amount to provide a pH of about 3-6.

Embodiment (19) The method of embodiment (18), wherein the second organic acid is added in an amount to provide a pH of about 4-5.

Embodiment (20) The method of any one of embodiments (2)-(19), wherein the at least one metal salt comprises a metal cation and an anion, and the metal cation is lithium, zinc, silver, copper, titanium, nickel, cobalt, zirconium, molybdenum, tin, or a combination thereof.

Embodiment (21) The method of embodiment (20), wherein the anion is halide, hydroxide, acetate, nitrate, chlorate, perchlorate, sulfate, thiocyanate, sulfide, oxide, nitride, carbonate, oxalate, chromate, phosphate, or a combination thereof.

Embodiment (22) The method of any one of embodiments (20)-(21), wherein the at least one metal salt is selected from zinc chloride, zinc acetate, copper chloride, copper sulfide, and a combination thereof.

Embodiment (23) An antimicrobial composition comprising the disinfecting composition prepared by the method of any one of embodiments (1)-(22).

Embodiment (24) The antimicrobial composition of embodiment (23), wherein the composition further comprises an alcohol.

Embodiment (25) The antimicrobial composition of embodiment (24), wherein the alcohol is ethanol.

Embodiment (26) The antimicrobial composition of any one of embodiments (23)-(25), wherein the composition further comprises at least one polymer selected from a cationic polymer, a non-ionic polymer, and cellulose.

Embodiment (27) The antimicrobial composition of embodiment (26), wherein the composition further comprises a cationic polymer selected from a polydiallyldialkylammonium salt, an acryloxyalkyltrialkylammonium salt, a vinylphenalkyltrialkylammonium salt, an acrylamidoalkyltrialkylammonium salt, a poly(acrylamide-co-diallyldialkylammonium salt), a polyethylenimine-based polymer, chitosan optionally in combination with an anionic polymer, and a combination thereof.

Embodiment (28) The antimicrobial composition of embodiment (26) or (27), wherein the composition further comprises a non-ionic polymer selected from a polyacrylamide, a polyamine, a polyamidoamine, polyethylene glycol, polyvinyl pyrrolidone, polyvinyl alcohol, a polyacrylate (e.g., poly(methyl)methacrylate), and any combination thereof.

Embodiment (29) The antimicrobial composition of any one of embodiments (26)-(28), wherein the composition further comprises nanocellulose.

Embodiment (30) A method of disinfecting a surface, the method comprising applying to the surface the antimicrobial composition of any one of embodiments (23)-(29).

Embodiment (31) The method of embodiment (30), wherein the composition forms an antimicrobial residual film on the surface.

Embodiment (32) The method of embodiments (30) or (31), wherein the surface is a filter membrane or textile.

Embodiment (33) The method of embodiment (30), wherein the surface is mammalian tissue.

Embodiment (34) The method of embodiment (33), wherein the antimicrobial composition is applied as a nebulized formulation.

The following examples further illustrate the invention but, of course, should not be construed as in any way limiting its scope.

Example 1

This example demonstrates the effect of the number average molecular weight of linear PEI has on the charge density.

Figure 2:
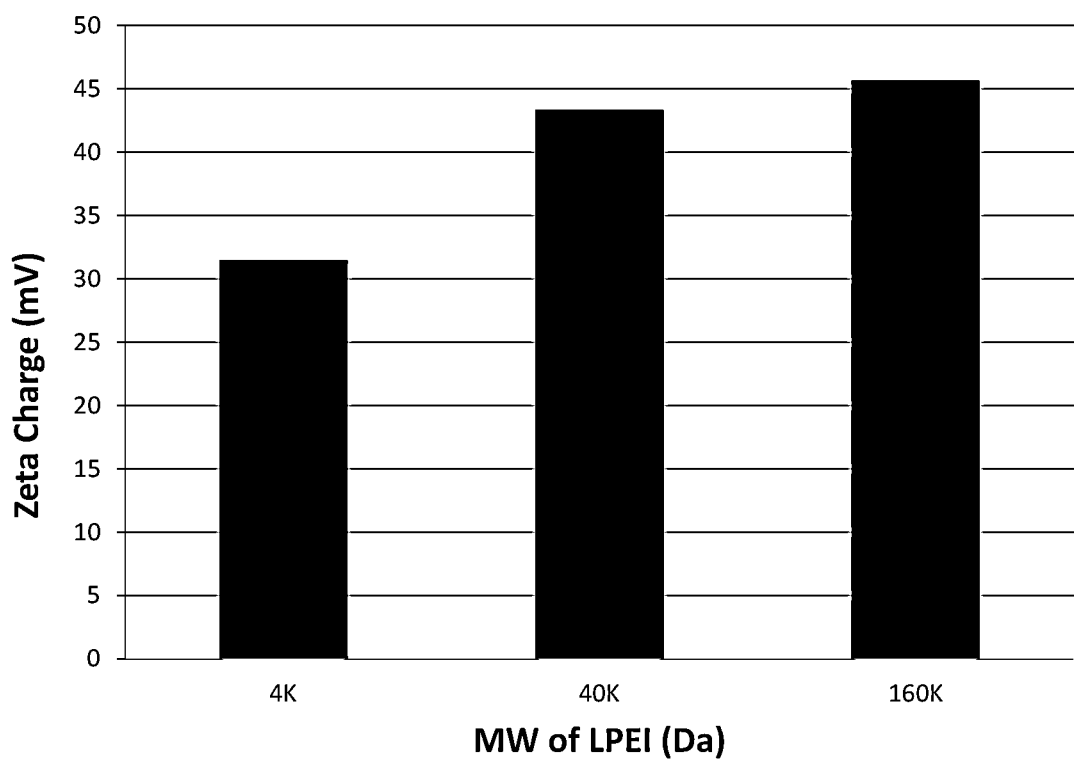
FIG. 2 is a bar graph demonstrating the zeta potential as a function of the number average molecular weight of linear PEI.

Three solutions were prepared comprising 4 g/L (4,000 ppm) linear PEI with 50% NaCl salt, acetic acid, and water, with a pH of 4.5. The number average molecular weight of the linear PEI was varied among each sample: 4 kDa, 40 kDa, and 160 kDa. The zeta charge of each sample was measured (mV). As seem in FIG. 2, higher zeta potentials were observed with higher number average molecular weight.

Example 2

This example describes a method to test the relationship between the salt concentration and zeta charge.

A stock solution comprising 4 g/L (4,000 ppm) of linear PEI with a number average molecular weight of 40 kDa, acetic acid, and a pH of 4.5 was subjected to varying times of dialysis to obtains samples with different levels of salt reduction. The amount of salt in each sample was determined by measuring the solution conductivity expressed in millisiemens or microsiemens. For purposes of describing the percentage of salt reduction, the percent reduction in solution conductivity was calculated. While it is known that linear PEI itself is a weak polyelectrolyte, this approach was deemed adequate for demonstrating the impact of removing increasing amounts of salt on the zeta potential of linear PEI. The samples with varying salt contents were measured for LPEI charge density using traditional zeta potential analysis.

Figure 3:
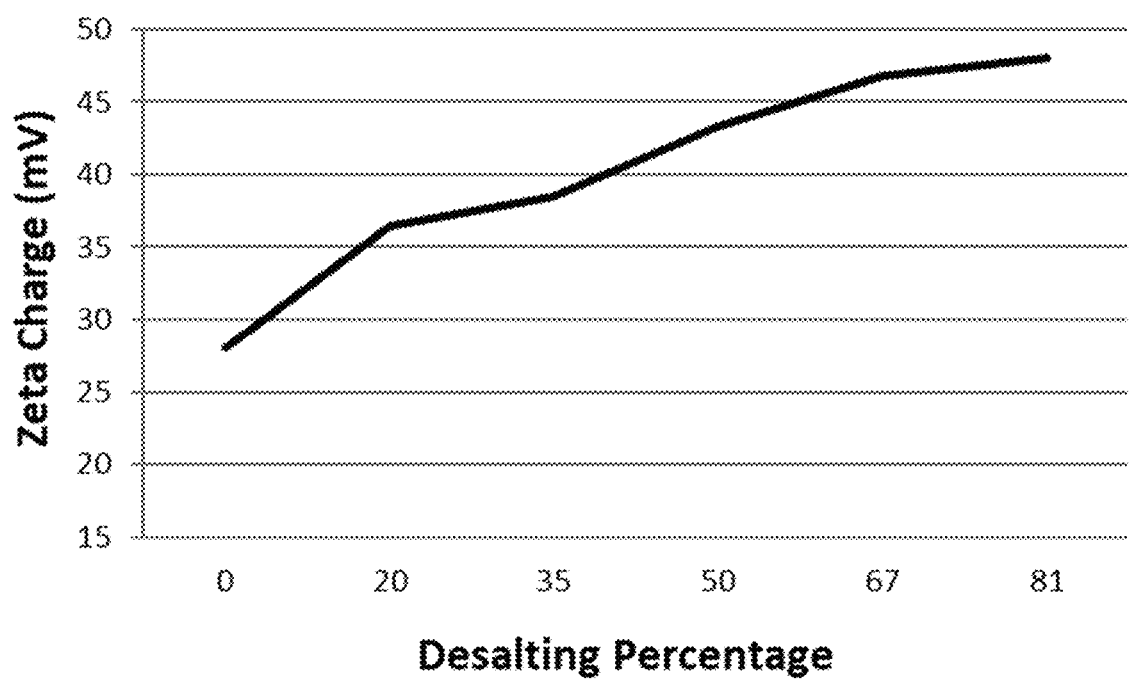
FIG. 3 is a line graph plotting the zeta potential as a function of desalting percentage.

The results are shown in FIG. 3, which demonstrate that reducing the neutral salt content significantly increases the zeta potential of a linear PEI solution. In particular, at 81% reduction in salt, the zeta charge was 47.98 mV. With no salt removal, the zeta charge was 28 mV. Thus, with 81% of the salt removed, the zeta charge of the linear PEI was significantly increased by 71%.

Example 3

This example demonstrates the relationship between the pH of the linear PEI solution and zeta charge.

Figure 4:
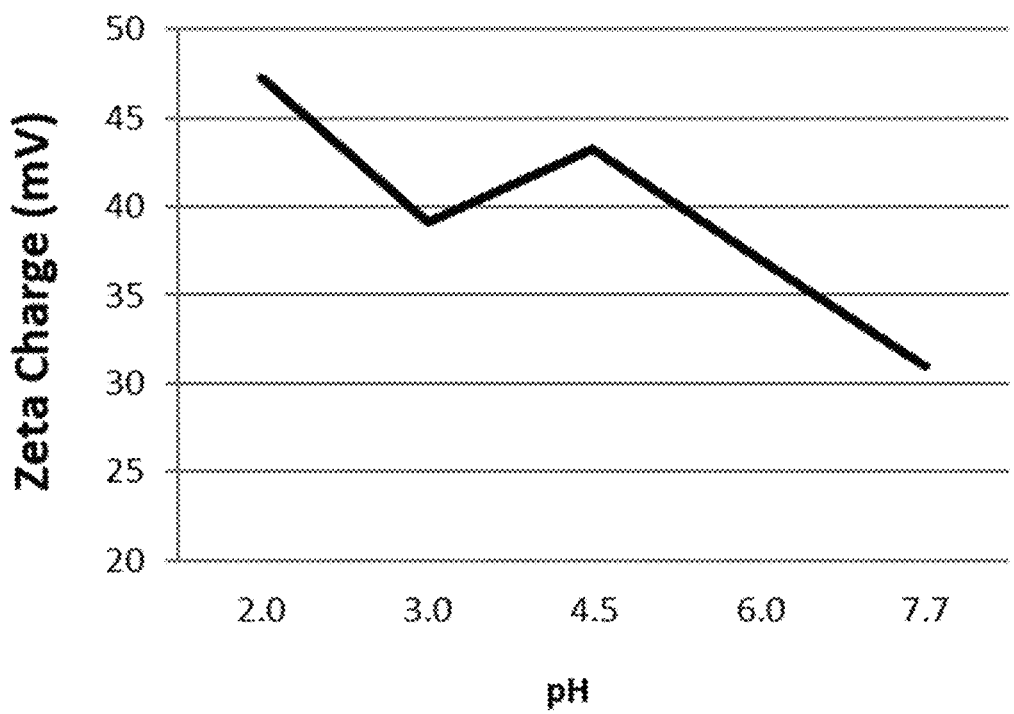
FIG. 4 is a line graph plotting the zeta potential as a function of pH.

A stock solution comprising 4 g/L (4,000 ppm) of linear PEI with a number average molecular weight of 40 kDa and about 50% salt reduction. Test samples were prepared by adding acetic acid in an amount sufficient to provide pH values of the test samples ranging between 2-7.7. The zeta potential of the LPEI charge density was measured for each of the test samples. The results are shown in FIG. 4, which demonstrate that reducing the pH of the linear PEI solution significantly increases the zeta potential.

Example 4

This example demonstrates the importance of salt reduction on the antimicrobial activity.

Two different antimicrobial spray products designed to leave a residual antimicrobial film were prepared. Solution A (inventive) was formulated comprising 4 g/L (4,000 ppm) of linear PEI (number average molecular weight of 40 kDa and 50% salt reduction) prepared in accordance with the method steps (i) through (vi) and 2 g/L (2,000 ppm) polyDADMAC in a solution of 70% ethanol, 29% water, and 0.3% acetic acid. The solution had a pH of 4.5. Solution B (comparative) was formulated comprising 4 g/L (4,000 ppm) of linear PEI (number average molecular weight of 40 kDa and no salt reduction) and 2 g/L (2,000 ppm) polyDADMAC in a solution of 70% ethanol, 29% water, and 0.3% acetic acid. The solution had a pH of 4.5.

Figure 5A:
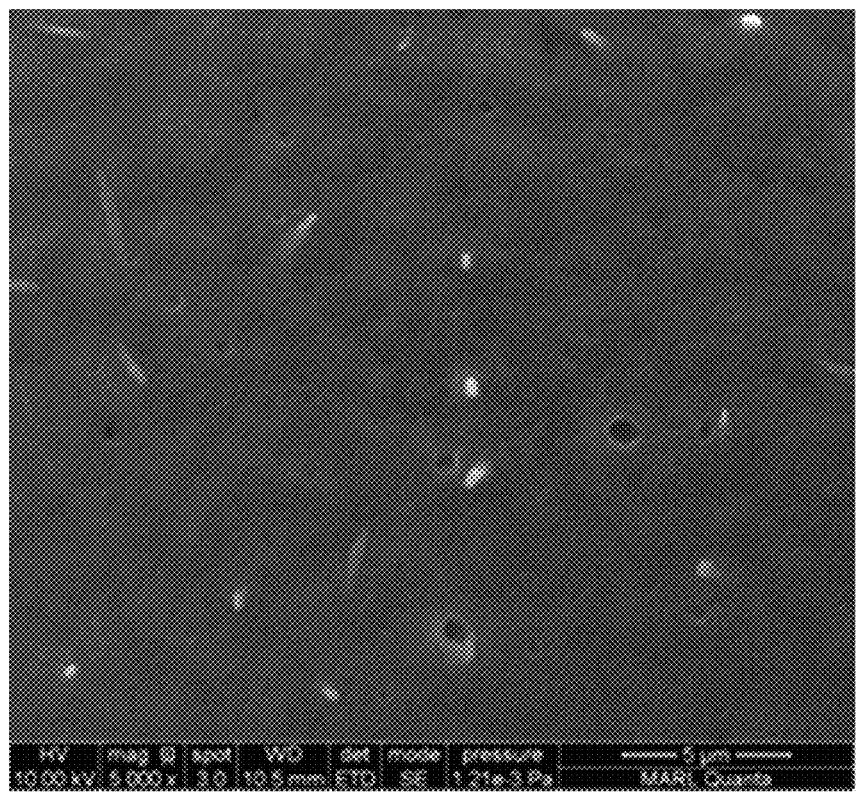
FIG. 5 is scanning electron microscope (SEM) images of films formed from Solution A (inventive) (FIG. 5A) and Solution B (comparative) (FIG. 5B).
Figure 5B:
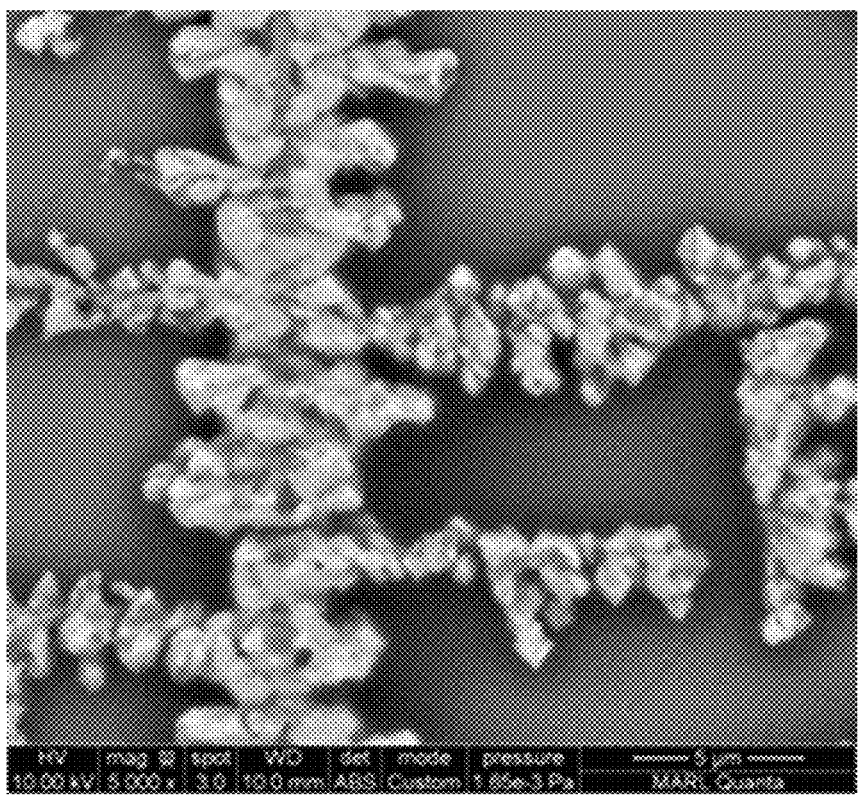

Each solution was sprayed onto a slide and was left to dry. Scanning electron microscope (SEM) images of the two films formed are shown in FIG. 5A (Solution A (inventive)) and FIG. 5B (Solution B (comparative)). The salt in the film formed by Solution B is clearly seen.

The antimicrobial activity of the films that formed were measured, as set forth in Table 1. The test was a 5 minute test on the residual antimicrobial film against *Klebsiella* pneumonieae cells (ATCC #4352), which is a difficult to inactivate gram-negative bacteria. The antimicrobial activity was measured as the $\log_{10}$ reduction in accordance with the following formula:

antimicrobial activity=log(number of starting microbes/number of microbes after 5 min)

TABLE 1

| Sample | Number of Recovered *Klebsiella pneumonieae* Cells after 5 Minutes | % Reduction | Antimicrobial Activity |
|---|---|---|---|
| Internal control | $1.65 \times 10^5$ | n/a | n/a |
| Sample A (inventive) | $1.0 \times 10^1$ | 99.994% | 4.22 |
| Internal control | $5.98 \times 10^5$ | n/a | n/a |
| Sample B (comparative) | $3.08 \times 10^4$ | 94.85% | 1.29 |

Solution A (inventive) with reduced salt showed a remarkable improvement in antimicrobial performance in a log 5 challenge compared to Solution B (comparative) that had no salt removal. A log 5 challenge with a 99.994% kill means that out of every 100,000 organisms, all but 6 organisms were inactivated, compared to over 5,000 remaining live organisms with a full salt formulation. As seen in Table 1, the antimicrobial activity of Solution A (inventive) was 3.27 times greater than the antimicrobial activity of Solution B (comparative). The contrast in antimicrobial performance is significant, and proves that linear PEI with a reduced salt content is very highly antimicrobial.

The zeta potential of the film formed by Solution A (inventive) was measured to be 40.26 mV (pH of 7), demonstrating that the low salt formulation maintained a very high surface zeta potential even after forming a residual antimicrobial film. This, in part, explains why the residual film was capable of inactivating 99.99% of a very difficult to kill gram negative bacteria in 5 minutes. The zeta potential of the film was tested at a pH of 7 because surface bacteria reside in fluids at pH 7.

Example 5

This example demonstrates the zeta potential of non-hydrochloride PEI.

A stock solution comprising 1 g/L (1,000 ppm) non-hydrochloride, linear PEI (number average molecular weight of 2,500 Da) in a solution of 95% water and 5% ethanol was prepared. The test sample had a pH of 7.

The zeta potential of the non-HCl LPEI charge density was measured and found to be 35.58 mV.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a disinfecting composition comprising charged, non-chemically modified, linear polyethylenimine (PEI), the method comprising:
    (i) providing an aqueous solution comprising a linear PEI hydrochloride solution,
    (ii) adding a base in an amount to provide a linear PEI salt solution with a pH between 9-11,
    (iii) adding a first organic acid to the solution obtained in (ii) to reduce the pH to less than 7,
    (iv) removing about 20% to 100% of the salt from the solution obtained in (iii) to provide the disinfecting composition comprising charged, non-chemically modified, linear PEI, and then
    (v) optionally adding water and/or a second organic acid to the solution obtained in (iv) to obtain the disinfecting composition with a pH of 2-7.

2. The method of claim 1 further comprising (vi) adding at least one metal salt to the disinfecting composition comprising charged linear PEI with reduced salt content, organic acid, and water.

3. The method of claim 1, wherein the concentration of linear PEI hydrochloride is 30 g per liter of solute or less.

4. The method of claim 1, wherein the base is a strong base.

5. The method of claim 4, wherein the strong base is an alkali metal hydroxide, an alkaline earth metal hydroxide, a transition metal hydroxide, or a combination thereof.

6. The method of claim 1, wherein the first organic acid is a monocarboxylic acid.

7. The method of claim 6, wherein the monocarboxylic acid is selected from formic acid, acetic acid, propionic acid, butanoic acid, isobutyric acid, pentanoic acid, hexanoic acid, heptanoic acid, octanoic acid, decanoic acid, dodecanoic acid, and a combination thereof.

8. The method of claim 7, wherein the first organic acid is formic acid.

9. The method of claim 1, wherein the first organic acid is added in an amount to provide a pH of about 4-6.

10. The method of claim 1, wherein 40% to 90% of the salt is removed.

11. The method of claim 1, wherein the salt is removed by dialysis.

12. The method of claim 1, wherein the second organic acid is a monocarboxylic acid.

13. The method of claim 12, wherein the monocarboxylic acid is selected from formic acid, acetic acid, propionic acid, butanoic acid, isobutyric acid, pentanoic acid, hexanoic acid, heptanoic acid, octanoic acid, decanoic acid, dodecanoic acid, and a combination thereof.

14. The method of claim 1, wherein the second organic acid is added in an amount to provide a pH of about 3-6.

15. The method of claim 2, wherein the at least one metal salt comprises a metal cation and an anion, and the metal cation is lithium, zinc, silver, copper, titanium, nickel, cobalt, zirconium, molybdenum, tin, or a combination thereof.

16. The method of claim 15, wherein the at least one metal salt is selected from zinc chloride, zinc acetate, copper chloride, copper sulfide, and a combination thereof.

17. The method of claim 1, wherein salt is removed by washing, dialysis, filtration, diafiltration, centrifugation, evaporation, crystallization, or a combination thereof.

* * * * *